US011577827B2

(12) United States Patent
Randall et al.

(10) Patent No.: US 11,577,827 B2
(45) Date of Patent: Feb. 14, 2023

(54) YAW-ENHANCING ATTITUDE CONTROL SYSTEM FOR VTOL FIXED-WING AIRCRAFT

(71) Applicant: Qingdao Randall Aerodynamic Engineering, LLC, Jiaozhou (CN)

(72) Inventors: Ryan M. Randall, Tucson, AZ (US); Chunmei Chen, Jiaozhou (CN)

(73) Assignee: Qingdao Randall Aerodynamic Engineering, LLC

( * ) Notice: Subject to any disclaimer, the term of this patent is extended or adjusted under 35 U.S.C. 154(b) by 993 days.

(21) Appl. No.: 16/278,506

(22) Filed: Feb. 18, 2019

(65) Prior Publication Data
US 2019/0263513 A1 Aug. 29, 2019

(30) Foreign Application Priority Data

Feb. 27, 2018 (CN) .......................... 201810163609.9

(51) Int. Cl.
B64C 27/22 (2006.01)
B64C 29/02 (2006.01)
B64C 39/02 (2023.01)

(52) U.S. Cl.
CPC .............. B64C 27/22 (2013.01); B64C 29/02 (2013.01); B64C 39/024 (2013.01)

(58) Field of Classification Search
CPC ......... B64C 27/22; B64C 29/02; B64C 29/00; B64C 39/024; B64D 35/06
See application file for complete search history.

(56) References Cited

U.S. PATENT DOCUMENTS 2,397,632 A * 4/1946 Stuart ..................... B64C 29/02
244/17.23
2,712,420 A * 7/1955 Amster ................... B64C 29/02
244/225
(Continued)

FOREIGN PATENT DOCUMENTS

CN 207045728 U 2/2018
CN 108313282 A * 7/2018
(Continued)

OTHER PUBLICATIONS

A novel hybrid UAV U-Lion that may change the way people operate drones. https://www.suasnews.com/2017/03/novel-hybrid-uav-u-lion-may-change-way-people-operate-drones/ By Press—Mar. 28, 2017.
(Continued)

*Primary Examiner* — Benjamin P Lee
(74) *Attorney, Agent, or Firm* — Ward Law Office LLC; Jacob M. Ward

(57) ABSTRACT

An unmanned aircraft capable of vertical takeoff, vertical landing, and/or flight in a hovering orientation is presented; its fixed-wing is positively-swept and of low aspect-ratio with suitable airfoils. The unmanned aircraft includes a thruster comprising two contra-rotating motors and propellers forward of the fixed-wing's leading-edge and a rudderless fin aft of the center-of-mass, all of which lie on the aircraft's plane-of-symmetry. Two elevons provide pitch and roll control. The unmanned aircraft can stand upright on its feet.

A control system for aircraft with at least one wing is also presented. The control system includes a mount and attached thruster which lie on the plane-of-symmetry forward of the fixed-wing's leading-edge. A hinge axis approximately per-
(Continued)

pendicular to the aircraft's horizontal plane passes through the mount. The thruster rotates about the hinge axis for aircraft yaw control.

13 Claims, 14 Drawing Sheets

(56) References Cited

U.S. PATENT DOCUMENTS

| | | | | |
|---|---|---|---|---|
| 2,743,886 | A * | 5/1956 | Driggs | B64C 29/02 D12/326 |
| 5,289,994 | A * | 3/1994 | Del Campo Aguilera | B64C 39/024 244/17.23 |
| 5,996,933 | A * | 12/1999 | Schier | B64C 27/10 244/17.11 |
| 6,398,157 | B1 * | 6/2002 | Ingram | B64C 29/02 244/46 |
| 8,418,959 | B2 * | 4/2013 | Kang | B64C 39/024 244/116 |
| 8,505,846 | B1 * | 8/2013 | Sanders, II | B64C 11/003 244/7 B |
| 9,517,838 | B1 * | 12/2016 | Howard | B64C 27/12 |
| 9,751,619 | B1 * | 9/2017 | Howard | B64C 27/04 |
| 10,054,958 | B2 * | 8/2018 | Creasman | B64C 3/56 |
| 10,112,707 | B1 * | 10/2018 | Howard | B64C 39/024 |
| 10,287,010 | B2 * | 5/2019 | Stamps | B64C 27/12 |
| 10,287,013 | B2 * | 5/2019 | Starace | B64C 9/00 |
| 10,370,089 | B2 * | 8/2019 | Gamble | B64C 17/04 |
| 10,414,492 | B2 * | 9/2019 | Robertson | B64C 29/02 |
| 10,502,188 | B2 * | 12/2019 | Gamble | B64C 27/50 |
| 10,597,153 | B1 * | 3/2020 | Schuller | B60L 50/52 |
| 10,875,626 | B2 * | 12/2020 | Hefner | B64C 11/48 |
| 11,067,374 | B2 * | 7/2021 | Hill | G05D 1/0038 |
| 11,148,806 | B2 * | 10/2021 | Suzuki | B64C 39/024 |
| 2002/0074452 | A1 * | 6/2002 | Ingram | B64C 3/40 244/7 B |
| 2003/0006339 | A1 * | 1/2003 | Capanna | B64C 29/02 244/7 R |
| 2011/0290937 | A1 * | 12/2011 | Salkeld | B64C 17/04 348/E7.085 |
| 2015/0028155 | A1 * | 1/2015 | Reiter | B64C 3/385 244/39 |
| 2017/0233070 | A1 * | 8/2017 | Starace | G05D 1/0858 244/7 B |
| 2018/0057162 | A1 * | 3/2018 | Robertson | B64C 27/54 |
| 2018/0118334 | A1 * | 5/2018 | Stamps | B64C 27/12 |
| 2018/0354612 | A1 * | 12/2018 | Hefner | B64C 11/48 |
| 2019/0031316 | A1 * | 1/2019 | Hefner | B64C 39/006 |

FOREIGN PATENT DOCUMENTS

| | | | | |
|---|---|---|---|---|
| CN | 110466749 A | * | 11/2019 | |
| EP | 3140188 B1 | * | 12/2018 | B64C 11/48 |
| EP | 3415426 B1 | * | 8/2019 | B64C 11/48 |
| GB | 2588478 A | * | 4/2021 | B64C 11/28 |
| JP | 2001213397 A | * | 8/2001 | B64C 29/02 |
| JP | 4499155 B2 | * | 7/2010 | B64C 27/10 |
| WO | WO-2017044388 A1 | * | 3/2017 | B64C 27/57 |
| WO | WO-2019084431 A | * | 5/2019 | B64C 25/32 |

OTHER PUBLICATIONS

VD200. http://www.navaldrones.com/VD200.html.
Latitude Engineering's HQ-60. https://www.latitudeengineering.com/2016/08/hq-60-sets-new-standard-for-time-aloft/.
Defense Advanced Research Projects Agency, Tern. https://www.darpa.mil/program/tern.
Convair XFY-1 Pogo, https://airandspace.si.edu/collection-objects/convair-xfy-1-pogo.

* cited by examiner

YAW-ENHANCING ATTITUDE CONTROL SYSTEM FOR VTOL FIXED-WING AIRCRAFT

CROSS-REFERENCE TO RELATED APPLICATIONS

This application is claims priority to People's Republic of China Application (CN) 201810163609.9 with a filing date of Feb. 27, 2018 (2018-02-27).

BACKGROUND OF THE INVENTION

(1) Field of Invention

The novel apparatus presented below relate to the field of control systems and aircraft.

(2) Description of Related Art

Aircraft

Aircraft have many private and commercial applications as aerial sensor platforms (i.e. video-acquisition), delivery systems, environmental sensing, and communication relays. They can be classified based on their method of aerodynamic lift generation as: fixed-wing, rotary-wing, hybrid, or flapping-wing. Such vehicles are useful in various private and commercial applications, as well as public sectors, including: search and rescue, border security, law enforcement, and environmental monitoring.

Traditional hover-capable fixed-wing model aircraft have been around for decades. They have a single propeller and combustion engine sufficiently powerful for them to "hang-off-the-prop". These vehicles have a conventional empennage, so they can't take advantage of vertical-takeoff or landing despite their ability to hover. Their single slipstream induces yawing moment as the slipstream strikes a vertical stabilizer, requiring drag-inducing compensatory rudder deflection. Changes in throttle cause a roll-jerk due to a reactionary moment exerted on the aircraft. These planes are unstable in hover and sensitive to wind gusts.

Hybrid aircraft can solve some of these problems. They combine the advantages of different categories of aircraft, for example: fixed and rotary wing. This allows them to successfully perform functions that a conventional aircraft cannot. The most promising type of hybrid aircraft is the vertical-takeoff-and-landing (VTOL) fixed-wing aircraft. This kind of aircraft can fly quickly and efficiently to a distant location like a conventional fixed-wing, then transition to fly low-and-slow, hover, etc. In effect, the aircraft performs like a helicopter or multi-rotor onsite, but with the range, endurance, and top-speed of conventional airplanes when traveling to-and-from the target location.

Existing hybrid UAVs use many different designs and configurations. The novel apparatus presented below can be used as a tail-sitter, of which there are few existing versions. The tail-sitter configuration is superior to other configurations in many ways.

One example of an unmanned hybrid tail-sitter is the Chinese VD-200. The VD-200 uses two counter-rotating propellers and motors located far away from the centerline of the vehicle. The two distant motors and propellers help to increase roll-inertia for increased roll stability, but if one motor fails the vehicle will crash. The VD-200's components are located within a central fuselage-like compartment (a blended wing-body design). The VD-200 has two separate slipstreams and two sets of vertical stabilizers for yaw stability (rather than one); it controls yaw using differential propulsive thrust. The VD-200 has ailerons for roll control, and elevators for pitch-control. The VD-200 has more control surfaces than is strictly necessary. It is also large and expensive, making it unsuitable for most non-military applications.

Quadrotor fixed-wing hybrids are becoming plentiful; one example is Latitude Engineering's HQ-60, which is a "jump" type. Others include the Aerovironment Quantix, and Swift 020, which are both "tail-sitter" types. These vehicles require four separated motors and propellers for control during hover; their high aspect ratio wings tend to blow-around in the wind.

Another fixed-wing tail-sitter design is still under development by DARPA; it is called "Tern". Unlike almost all other hover-capable tail-sitter fixed-wings Tern uses centerline propulsion. Tern's wing also has a high aspect ratio, but much of its wing is located within a broad slipstream to help resist stall. Tern uses rotor blades rather than propellers, which allow it to fly like a helicopter while hovering, with cyclical pitching for rotational control. Unfortunately, the contra-rotating rotor-blade solution is complex and expensive, which limits its application in the general market.

A similar vehicle to the novel apparatus presented below is the Convair Pogo, which was an experimental aircraft produced for the US Navy in 1954. It was a manned aircraft with a bulging centerline fuselage on the upper surface of the wing directly behind the propellers, which contributed to drag and unwanted flow asymmetry. The Pogo utilized combustion-based fuels, which contributed to pollution. It utilized thin airfoils that stalled easily during high-rate nose-downing pitching (transferring from vertically to horizontally-oriented flight), and its wing was not twisted, which required design compromises to push its center-of-mass forward of the neutral point for longitudinal stability. For yaw control the Pogo relied on rudders attached to its rear fins, which are prone to stall during high-rate yawing, "knife-edging", and other maneuvers. Fully-rotatable fins could have been used improve yaw performance, but were impractical for an aircraft that uses its fin-tips as part of its landing base. The Pogo was somewhat dangerous and difficult to fly, so the program was cancelled. A detailed definition of the term "fin" is provided in DEFINITIONS.

The uLion is a tail-sitting UAV. Its long fuselage results in a high center-of-mass, and its conventional tail results in an extremely narrow standing base. It is susceptible to tip-over prior to takeoff. Recovery is achieved using hand-catching, which greatly limits the maximum size of the aircraft. uLion components are stored in a bulky fuselage behind small-diameter propellers, which increases profile drag and reduces propulsive efficiency. The wing has a high aspect ratio, which makes it susceptible to being blow-around at low speeds and during hover. This was addressed using a swing-wing, which effectively creates a very low aspect ratio wing during hover, but involves a penalty in terms of weight, cost, number of servos, and complexity.

The novel apparatus presented herein (FIG. 1) solves all of the aforementioned problems. It utilizes two coaxial propellers at the vehicle centerline, which allows the vehicle to fly successfully even if one propeller or motor fails. Contra-rotation negates swirl in the slipstream, so compensatory yaw-input is not required. Internal components are distributed away from the vehicle centerline to achieve an acceptable amount of roll inertia and stability. Elevons are used instead of ailerons+an elevator, which reduces the total number of control surfaces. The risk of fin-stall is reduced by using either rotatable fins or thrust-vectoring to control yaw.

The novel thrust-vectoring system for yaw control provides excellent performance without interfering with tail-sitting. It simple and inexpensive relative to the aforementioned vehicles, and can be scaled-down considerably.

The novel apparatus presented herein does not have a bulging fuselage-type structure, just a protruding motor mount or nacelle. It uses electrical propulsion, which creates less noise and air pollution. Its wing is twisted to shift the neutral point aft-ward to provide more center-of-mass flexibility. The wing has thick stall-resistant airfoils. It's sleek and elegant design includes just three servos, no conventional tail, a fixed-wing, and a stable landing base.

The current design can be used by private individuals (i.e. explorers, hobbyists, backpackers/trailblazers), commercial interests (filming, photography, etc.), and smaller public sector entities (i.e. local law enforcement, border security, environmental monitoring, etc.). It is affordable enough for various different users, and it is small enough to be used in cluttered, urban, and indoor environments where larger hybrid vehicles cannot be safely flown.

Control System

Aircraft control systems utilizing moveable control surfaces have been used since the days of the Wright Brothers. The earliest aircraft used elevators for pitch and rudders for yaw/roll control, respectively. These aircraft rolled and turned very slowly. Wing-warping was later invented by the Wright Brothers, which allowed independent three-axis control of aircraft for the first time, as well as increased rolling rates and reduced turning radii. Afterward, Glenn Curtiss invented ailerons for roll-control, which was a significant simplification and improvement over wing-warping.

Since then, people have invented various aircraft control systems. These include stabilators, which combine the stabilizing function of horizontal stabilizers with the pitch-control function of elevators. Another invention is elevons, which are normally used to combine the function of elevators and ailerons in flying-wing and blended wing-body designs. Elevons deflect symmetrically and differentially for independent pitch and roll control, respectively.

Similarly, fully-rotatable fins have been invented to combine the function of vertical stabilizers and rudders. V-tails have also been invented as hybrid vertical/horizontal stabilizers, typically with moveable control surfaces that are hybrid rudders/elevators. These systems are not suitable for tail-sitters.

Some fixed-wing vertical takeoff and landing (VTOL) aircraft can be described as X-wing aircraft with four moveable control surfaces on what is essentially two adjacent V-tails. These vehicles may have four independently moveable control surfaces that hinge about fixed stabilizers, analogous to traditional rudders and elevators from the beginning of fixed-wing flight. They are prone to stall during high-rate yawing. Alternatively, these vehicles may use fully-rotatable fins analogous to those often used for supersonic rockets and missiles.

Thrust vectoring, also known as thrust vector control or TVC, is the ability of an aircraft, rocket, or other vehicle to manipulate the direction of the thrust from its engine(s) or motor(s) in order to control the attitude or angular velocity of the vehicle. Thrust vectoring has been used on aircraft like fighter jets via jet engines with deformable exit nozzles, and for space and "lift fan" type fixed-wing VTOL vehicles using small thrusters. Some vehicles achieve yaw control using two separate motors, usually placed at wingtips, that can produce differential thrust. Moving an entire engine or motor to vector thrust exclusively for yaw-control has, to the author's knowledge, never been used. Tilt-rotor vehicles, like the V-22 Osprey, utilize rotatable engines to vector thrust, but those engines rotate about horizontal axes for the purpose of carrying the weight of the vehicle during hover, and to provide forward-propulsion during conventional flight. Rotational control of the V-22 is achieved, in part, via cyclical pitching of rotor blades, as in helicopters.

The uLion has a control system featuring a mount with an attached thruster that rotates about two perpendicular axes combined with four movable tail control surfaces. It uses six actuators to control aircraft rotation about three axes. Using six actuators unnecessarily increases aircraft weight, cost, and complexity. Rather than relying on two-axis thrust-vectoring for control during hover, and conventional surfaces for control during conventional flight, a single set of control mechanisms driven by three actuators could be used for full control throughout the entire flight domain.

The uLion's use of thrust vectoring for pitch control causes the slipstream to change direction such that it can approach the leading-edge of a wing at a high angle, which consequently causes stall and reduces pitch stability. uLion ensures that the slipstream doesn't induce stall over a fixed-wing's leading-edge by using a bulky fuselage and small diameter propellers—the wing is never in the slipstream. This configuration is sub-optimal for drag and propulsive efficiency. The bulky fuselage channels slipstream flow such that it passes over the empennage at near-zero angle of incidence.

Existing yaw control systems for tail-sitter fixed-wing hybrids (FIG. 1) suffer from many problems. The moment-arm to a fin is relatively short because, unlike conventional airplanes, there is no long fuselage with a conventional tail. Therefore, the fin must be larger to provide adequate passive yaw-stability during conventional flight. To achieve high yaw-maneuverability in a hovering orientation requires strong yawing moments, which pressures designers to make fins even larger. Fin-oversizing results in an unnecessary drag cost (Problem 1).

When a traditional rudder is deflected leftward, an effective camber and angle of attack (see DEFINITIONS) are produced for the fin airfoils and a rightward-acting force is exerted on the fin. If the fin is aft of the center-of-mass then a nose-left moment is produced, causing the aircraft to yaw nose-left. The nose-left yawing causes the aft fin to swing rightward such that a relative leftward air velocity component blows against the fin. If this velocity component is sufficiently large, it causes the effective angle of attack of the effectively-cambered fin airfoils to become negative and the fin readily stalls. Therefore, yawing-rate must be strictly-limited to prevent fin-stall, which comes at the expense of yaw-maneuverability (Problem 2).

Yaw instability in moderate winds can arise irrespective of fin-swinging velocity components. When a uniform lateral (sideways) wind blows against the aircraft, aerodynamic forces and moments change, which can be modeled using a mostly-lateral force that is forward of the center-of-mass and one that is aft of the center-of-mass (FIG. 2). For many designs these forces are predominately due to lateral forces on the propulsion system and the fin, and each of these forces will typically induce opposing yawing moments about the center-of-mass of the aircraft. The yawing moment induced by a large fin tends to dominate, regardless even when the rudder or fully-rotatable fin are fully-deflected. As the aircraft yaws into the wind, the thrust vector tilts, providing a lateral force component to drive lateral acceleration into the wind. As the aircraft's lateral velocity increases into the wind, so does the effective lateral wind-speed against the fin. This, in-turn, causes the aircraft to yaw even further into the wind. As a result the aircraft experiences a sudden loss of yaw stability and control (Problem 3).

Lateral aircraft flight can cause the same problem in the absence of any wind, due to forced yawing as a result of lateral flow at the fin (Problem 4). The fin is a critical component for passive yaw stability during conventional flight, so it is rarely omitted. Therefore, lateral flight in a hovering-orientation must be slow, otherwise a sufficiently strong counter-acting yawing moment may not be producible to maintain control of the aircraft and a crash may result.

Other designers have tried to ameliorate these problems through the use of a fully-rotatable fin with symmetric airfoils and no rudder. This fully-rotatable fin is better-able to resist stall at negative angles of attack because, unlike rudder-based systems, its airfoils always maintain zero effective camber. Designers have also located the fin within a strong slipstream to reduce the influence of lateral velocity components during near-hover. These combined methods have been used successfully on hovering aircraft of short span with centerline propulsion. While successful, the designers have satisfied themselves to fly in a hovering orientation in only mild winds, at small near-hover yaw angles, and at low lateral velocities.

A new aircraft control system is presented to solve the aforementioned problems using angular deflection of a mount, and any attached thrusters, about one axis to vector thrust, such that a yawing moment is produced. Elevons are partially located within the thruster's slipstream to provide control of pitch and roll while hovering. One or more fixed-fins can be located within the thruster's slipstream to further enhance yaw control, and they need-not have attached rudders nor be fully-rotatable (FIG. 13). This new aircraft control system can be used with a wide variety of different fixed-wing aircraft. It is particularly useful for tail-sitter fixed-wing aircraft with centerline propulsion, as it solves the yaw-control problem for such vehicles during flight and "opens-up" various aircraft design possibilities that are not practical or usable with existing control systems. Drag, complexity, cost, and weight, are not needlessly increased, and it does not create wing-stall or pitch-stability problems.

BRIEF SUMMARY OF THE INVENTION

Aircraft

The aircraft has a flying-wing design and a tail-sitter design (see DEFINITIONS). It is unmanned and capable of vertical takeoff, vertical landing, and flight in a hovering orientation. It has one or more fixed wings (1) (see DEFINITIONS); preferred embodiments have exactly one fixed-wing (1). The fixed-wing (1) is tapered and positively swept with respect to its quarter-chord line. The fixed-wing has an aspect ratio between 1 and 3.5; low aspect ratio wings are less gust-sensitive, which improves controllability during hover in moderate winds. The fixed-wing's (1) leading edge (101) and trailing edge (102) may be shaped as half-ellipses and joined at their outer tips giving the wing (1) a crescent-shaped planform (FIG. 3). A substantially crescent-shaped planform helps to achieve an elliptical span-wise load distribution across the fixed-wing (1) to minimize energy losses associated with wingtip vortices, which is especially important for low aspect ratio wings [1-3.5].

The airfoils (103) of the fixed-wing (1) are custom designed to ensure gradual changes in aerodynamic forces with changing orientations and control inputs (i.e. a "soft" stall). They are also designed to achieve an acceptably high lift coefficient and aerodynamic efficiency. The fixed-wing's airfoils (103) have a thickness (106, FIG. 4) that varies with chord-wise position. The thickness (106) is non-constant; its (106) maximum is greater than 6.5% of the airfoil's (103) chord-length (107), which discourages leading edge stall during rapid pitching and allows various components to be housed within the fixed-wing (1). The airfoils (103) have a round leading edge (104) and a trailing edge (105) that is sharper than the leading edge (104, see DEFINITIONS). This combination of features improves aerodynamic performance in terms of lift, drag, and efficiency, while helping to delay stall. The fixed-wing's (1) airfoils (103) are typically symmetric or reflexed, meaning that they have straight or S-shaped camber-lines (106) to promote pitch-stability. The fixed-wing (1) may be twisted such that its outboard airfoils (103) have a lower twist angle (119) than its inboard airfoils (103). This "washout" further promotes pitch stability, allows the aircraft's center-of-mass (112) to be placed further rearward, and reduces the likelihood and severity of tip-stalls. Airfoil (103) maximum thickness (106) also changes with span-wise position such that airfoils are thinner near the root of the wing (1) and thicker near the tips; this further reduces the likelihood and severity of tip-stalls.

The fixed-wing (1) may have an internal framework that comprises ribs (109) and spars (110), as seen in FIG. 5. The internal framework is rigid and coupled with skin (111) that may support loads ("load bearing") for maximum strength with minimum weight. The fixed-wing (1) is mostly hollow; its internal framework provides convenient anchoring points for the housing of various internal components. A panel (118) is located on the underside of fixed-wing (1) to avoid spoiling airflow over the wing's (1) upper-surface, as seen in FIG. 6. The panel (118) can be opened and closed to install and access components housed within the fixed-wing (1).

The aircraft has at least one antenna (9), which is used for control, telemetry, GPS, video, and/or other purposes. The antenna (9) is internally-mounted to maintain a streamlined exterior for improved aerodynamic performance. The antenna (9) can be located within a wing (1), elevon (5), fin (6), or mount (8), as in FIG. 6. The antenna (9) is surrounded by a kind of skin (111, 604, 506, 811). Some or all of that skin is made of fiberglass for good strength-to-weight ratio and RF transparency. Carbon fiber has a higher strength-to-weight ratio, but poor RF characteristics. When carbon fiber skin is used it should include holes covered with an RF-transparent material to form windows around internally-mounted antennas (9).

The aircraft has a thruster (2). A preferred thruster (2) embodiment for the aircraft and its control system comprises at least two motors (3) and at least two propellers (4) located forward of the fixed-wing's (1) leading edge (101) and centered on the aircraft's plane-of-symmetry (114). The preferred motors (3) and propellers (4) are counter-rotating and co-axial (FIG. 3). Reactionary moments of counter-rotating propellers largely cancel, which prevents unwanted rolling moment from being produced during throttling. Slipstream (201) swirl in non-coaxial propeller arrangements causes flow asymmetry over the wing. When swirling flow strikes a fin (6) it gives rise to undesired rolling and yawing moments. Contra-rotating (counter+coaxial) propellers (4) dramatically reduce flow asymmetry and slipstream swirl, but they can increase skin-friction drag due to premature boundary-layer transition over the fixed-wing (1) within the slipstream; this flow alternates between laminar and turbulent due to pulsations that arise whenever the two propellers (4) cross each-other. A large part of the fixed-wing's area, at least 10%, is immersed in the slipstream.

The preferred propellers (4) are fixed-pitch and have approximately the same rotation-rate. In a two-propeller embodiment, there is a leading propeller (401) and a trailing propeller (402). The leading propeller (401) introduces swirl into the flow, which changes the flow's approach angle into the trailing propeller (402). To compensate for this effect it is preferred that the leading propeller (401) have a lower pitch than the trailing propeller (402), as seen in FIG. 7.

Slipstream contraction occurs in accordance with conservation of mass applied to the slipstream modeled as a streamtube. Because the slipstream has a natural tendency to contract behind the leading propeller (401), it is preferential for the diameter of the leading propeller (401) to be greater than that of the trailing propeller (402, FIG. 7).

Pitch and roll control are achieved, for the aircraft and its control system, using elevons (5). The elevons (5) are designed to deflect symmetrically to produce non-zero pitching moments for pitch control (FIG. 8). The elevons (5) are also designed to deflect differentially to produce nonzero rolling moments for roll control (FIG. 9). The elevons (5) are symmetrically located about the plane of symmetry (114, see DEFINITIONS) near the wing's (1) trailing-edge (102), as seen in FIG. 3. The elevons (5) are of approximately equal size and shape. The elevons (5) are partially or wholly located within a thruster's (2) slipstream (201); slipstream flow maintains elevon (5) effectiveness even at very low speeds and during hover when there is little or no freestream flow.

The preferred method for elevon (5) actuation is to use an elevon servo (501), elevon servo horn (502), elevon push-pull rod (503), elevon control horn (504), and elevon hinges (505), as seen in FIG. 10. The elevon servo (501) is attached to a wing rib (107) using threaded fasteners and is fully-accessible when the panel (118) is opened or removed. The elevon servo (501) includes an internal gear box. It (501) has a protruding gear onto which the elevon servo horn (502) is press-fit. The servo horn (502) is further fixed to the elevon servo (501) using a threaded fastener. The elevon push-pull rod (503) has a Z-bend on each end, which allows it to pass through a hole in the elevon servo horn (502) and the elevon control horn (504) without slipping-out. The elevon control horn (504) is fixed to an elevon's (5) internal frame.

The preferred position for an onboard camera (110) is beneath the lower-surface of the fixed-wing (1), lying on the aircraft's plane-of-symmetry (114), near the aircraft's center-of-mass (FIG. 11). The camera can be protected by a transparent dome made of acrylic. The preferred position for a pitot tube (111) is near the leading-edge (101) of the fixed-wing (1) outside of the propulsive slipstream (201).

The aircraft will typically utilize one or more fins (6) for yaw-stability and/or to strengthen yaw control. The airfoils of the fin (6) are thick to delay stall and increase structural strength. Fin airfoil maximum thickness is greater than 6.5% of fin airfoil chord length. None of the fins (6) have an attached control surface (e.g. a rudder). Fully-rotatable fins (603, FIG. 11) can be used to provide yaw control. At least one fin (6) lies on the aircraft's plane-of-symmetry (114), aft of the aircraft's center-of-mass (112, FIGS. 1, 3), and near the trailing-edge (102) of the fixed-wing (1). A fin (6) can be placed on the fixed-wing's upper surface (FIG. 12A), on its lower-surface, or on both surfaces (FIG. 1). Three or more fins (6) can also be used (FIG. 12B).

The aircraft can stand upright (aka "tail-sit") on its feet (7, see DEFINITIONS) for takeoff and landing. A crescent-shaped planform for the fixed-wing (1) and/or fins (6) can be used to provide ample ground-clearance for taking-off and landing on uneven terrain. The feet (7) are located near the trailing-edges of the fixed-wing (1) and/or fins (6, FIG. 12A). The feet (7) can be wheels to ease non-flight repositioning of larger versions of the aircraft.

Preferred aircraft embodiments feature a novel control system that is described in CONTROL SYSTEM. These preferred aircraft embodiments can fly with no fins (6) at all, but will typically utilize one or more fixed-fins (FIG. 1). Fixed-fins are not designed to rotate with respect to the fixed-wing (1).

Control System

Traditional aircraft have high aspect ratio wings with ailerons on the wing for roll control, a traditional empennage with an elevator on the horizontal stabilizer for pitch control, and a rudder attached to the vertical stabilizer for yaw control. This configuration is not practical for unmanned hover-capable aircraft with low aspect ratio wings that stand upright on the ground to achieve VTOL. A new control system is needed, which may include elevons (5) for roll and pitch control, as previously-described (paragraph 35).

The present control system is intended for use on aircraft having at least one fixed-wing (1). The control system comprises at least one mount (8) located forward of the fixed-wing's leading-edge (101), and on the plane of symmetry (114). The mount (8) has at least one thruster (2) attached. The aircraft has a horizontal plane (115), which is perpendicular to the plane of symmetry (114) and coincident with two points: one on the leading edge (104) of the fixed-wing's root airfoil and one on the trailing edge (105) of the fixed-wing's root airfoil. The fixed-wing's root airfoil corresponds to the spanwise center of the wing (see DEFINITIONS). There is a hinge axis (116) that is approximately perpendicular to the horizontal plane such that its axis angle (117) between the horizontal plane (115) and the hinge axis (116) is between 65 and 115 degrees.

The thruster (2) rotates about the hinge axis (116) to vector thrust for aircraft yaw control (FIG. 13). When the thruster (2) rotates leftward about the hinge axis its slipstream (201) changes direction and the thrust vector (202) tilts leftward such that its line-of-action (203) passes to the right of the aircraft's center-of-mass (112). The result is a nose-left yawing moment (113) about the aircraft's center-of-mass (112). The thruster typically has spinning elements within it, but the thruster itself does not rotate about another axis except the hinge axis (116); thrust-vectoring is not used for aircraft roll or pitch control.

More effective yaw control for the control system is achieved with inclusion of at least one fin (6); the fin (6) is fixed such that it does not rotate with respect to the fixed-wing (1) and does not have any attached control surface. When a single thruster (2) is used, the thruster (2) lies on the aircraft's plane-of-symmetry (114); it is preferable that at least one fin (6) lie on the aircraft's plane-of-symmetry, aft of the aircraft's center-of-mass (112), and within the thruster's slipstream (201). When the thruster (2) rotates about the hinge axis (116) its slipstream (201) changes direction. This creates a non-zero angle of incidence at the fin (6) located within the slipstream (201), which gives rise to a lateral force (601) exerted on the fin (6). The fin (6) must be located aft of the aircraft's center-of-mass (112) such that when the thrust vector (202) tilts leftward, the lateral force (601) on the fin (6) is directed rightward to contribute to nose-left yawing moment (113) about the aircraft's center-of-mass (FIG. 13). At the same time the leftward-component of the thrust vector (202) and the rightward component of the lateral force (601) partially cancel one-another to create a more pure yawing moment to reduce unwanted lateral acceleration. This inventive approach results in superior yaw performance and handling characteristics.

The angular range of mount (8) rotation is restricted to between −12 and +12 degrees to prevent fin-stall and excessive flow asymmetry over the fixed-wing (1). This is especially important during hovering, vertical takeoff, and vertical landing, when the slipstream (201) is strong and the free-stream is weak or absent. From FIG. 13, it is apparent that the fin (6) will swing rightward, causing an effectively leftward relative wind against it. This leftward component of relative wind is opposed by the rightward flow component from the slipstream (201). As a result, extremely high yawing rates can be controllably achieved without fin stall—completely unlike competing systems.

Preferred embodiments of the control system utilize no more than three servos to achieve full three-axis rotational control of an aircraft throughout its various flight modes, orientations, and configurations. For example, just three servos can provide attitude control for a VTOL tail-sitter when it is vertically-oriented, when it is transitioning, and when it is flying in a conventional horizontal orientation. For these preferred embodiments there are exactly two elevons (5) and exactly one mount. One elevon servo (501) is used to actuate each of the two elevons (5) and one servo (804) is used to actuate the one mount (8).

DETAILED DESCRIPTION OF THE INVENTION

Definitions

Figure 1:
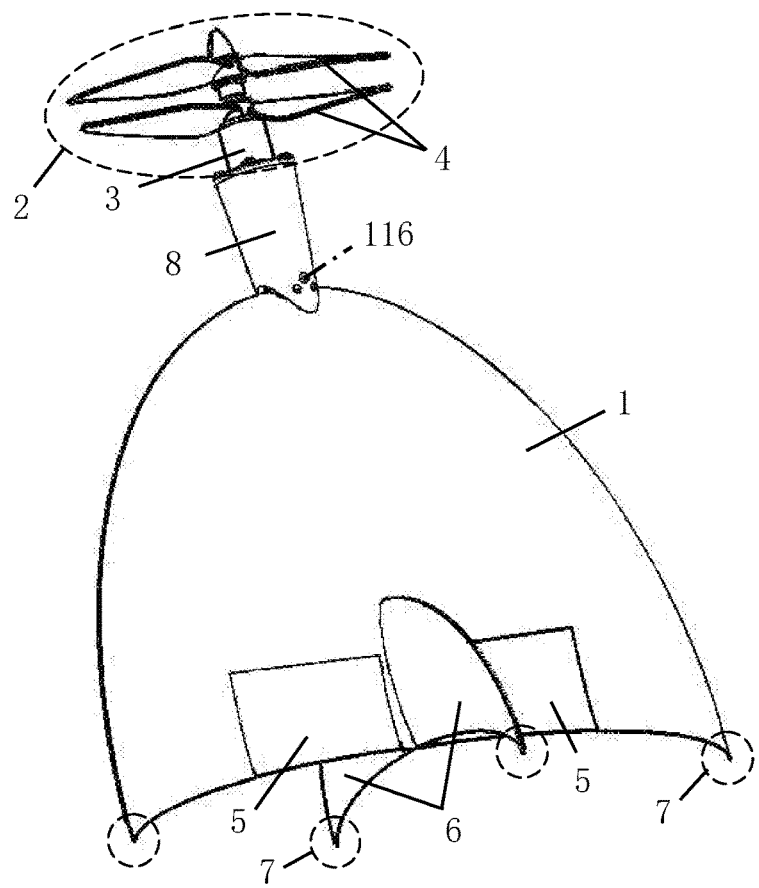
FIG. 1 is a perspective view of the aircraft and control system.
Figure 2:
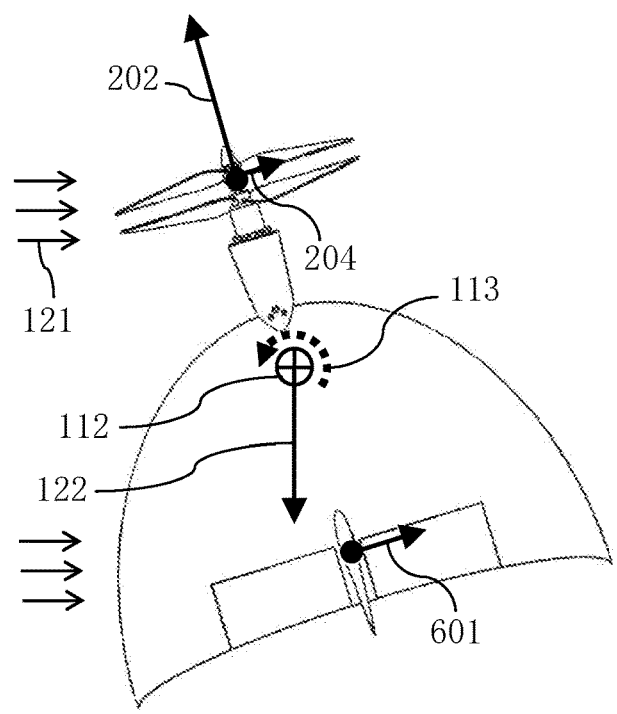
FIG. 2 is a planar force-moment diagram to illustrate a yaw stability issue for prior systems.
Figure 3A:
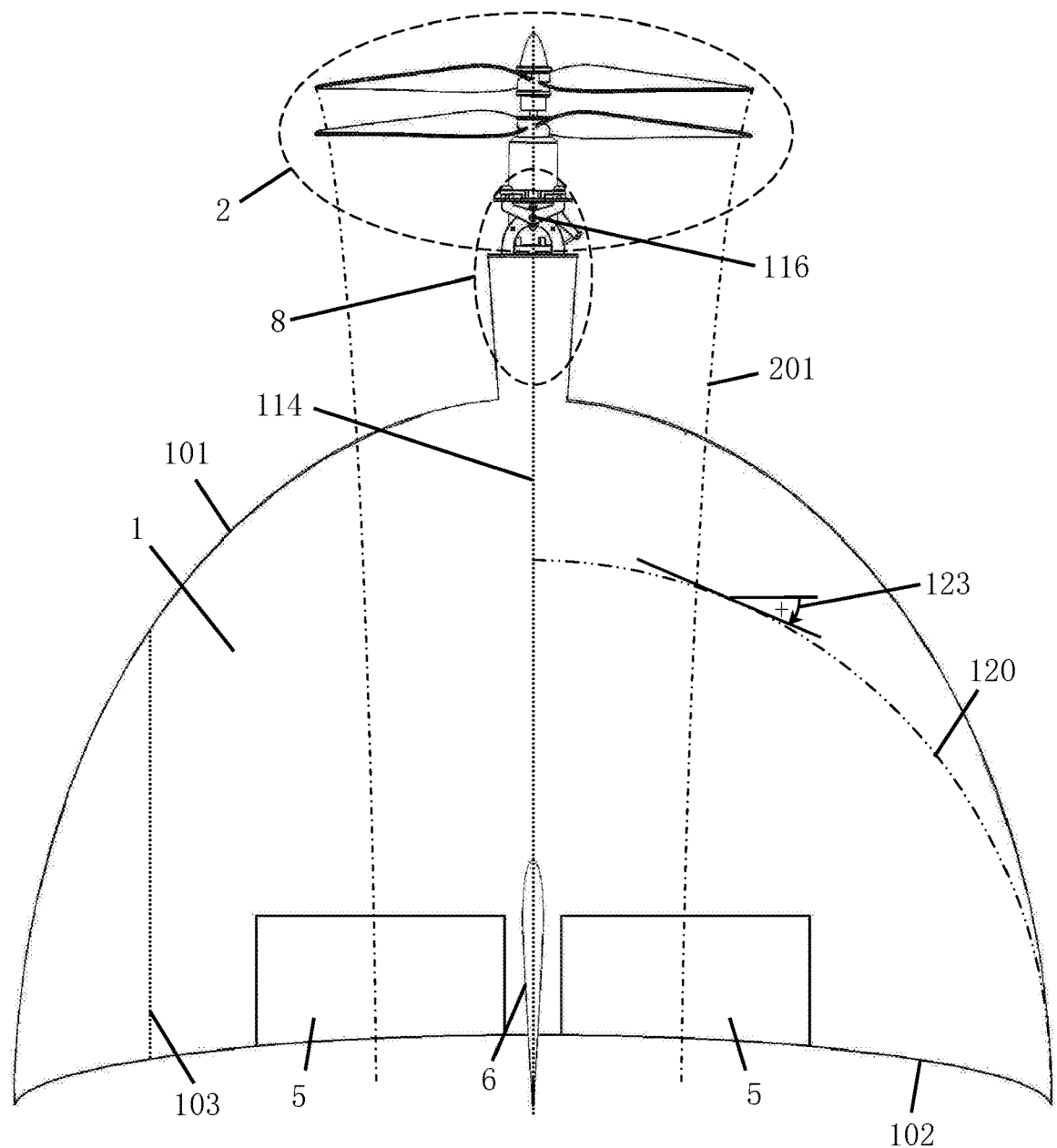
FIG. 3A is a planform view of the aircraft that helps to clarify related terminology.
Figure 3B:
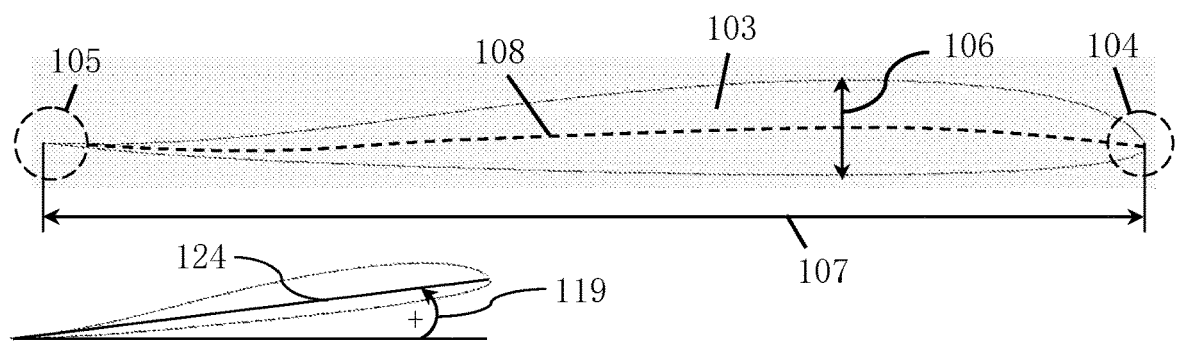
FIG. 3B depicts an example wing airfoil to clarify related terminology.
Figure 4:
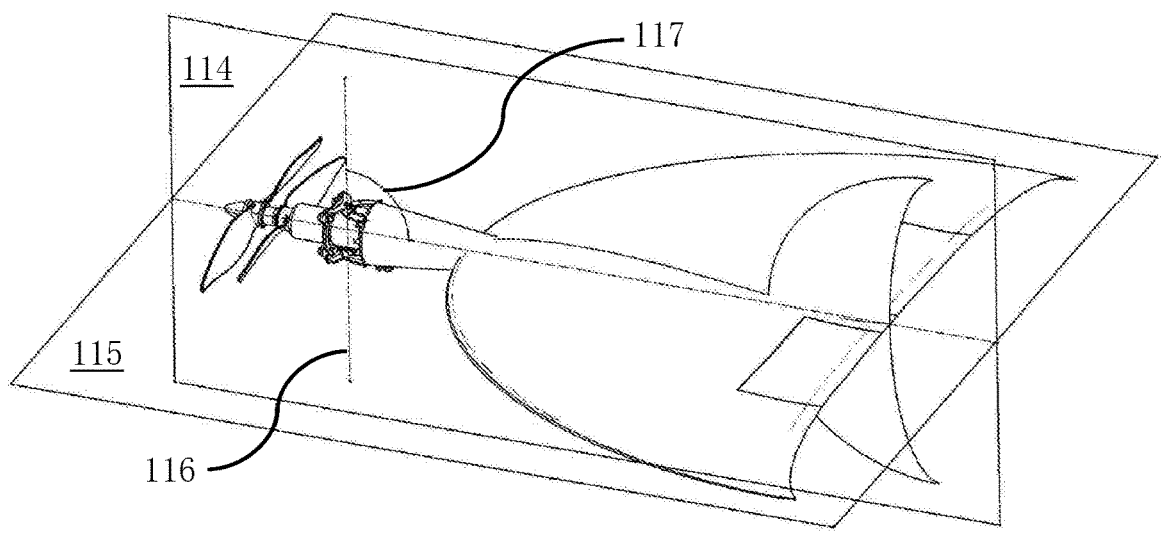
FIG. 4 clarifies terminology related to aircraft axes and planes.
Figure 5:
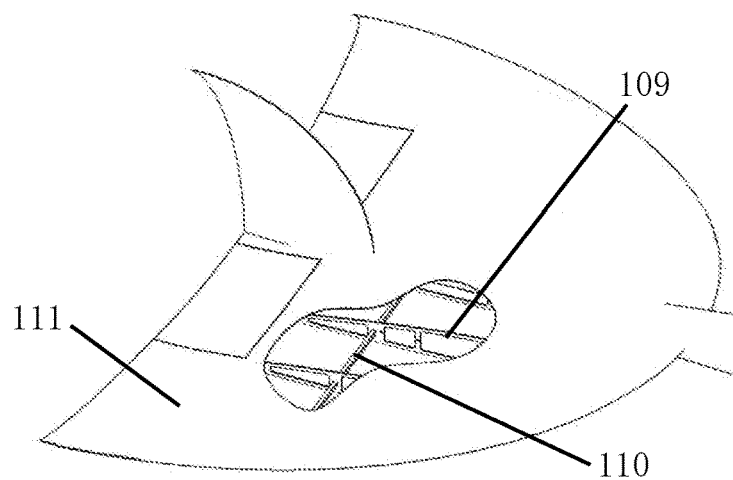
FIG. 5 is a perspective view illustrating the fixed-wing's structural design.
Figure 6:
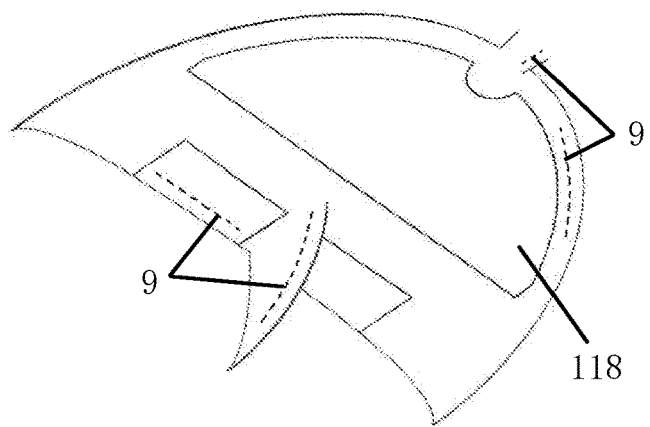
FIG. 6 shows an example wing panel and example internally-mounted antennas.
Figure 7:
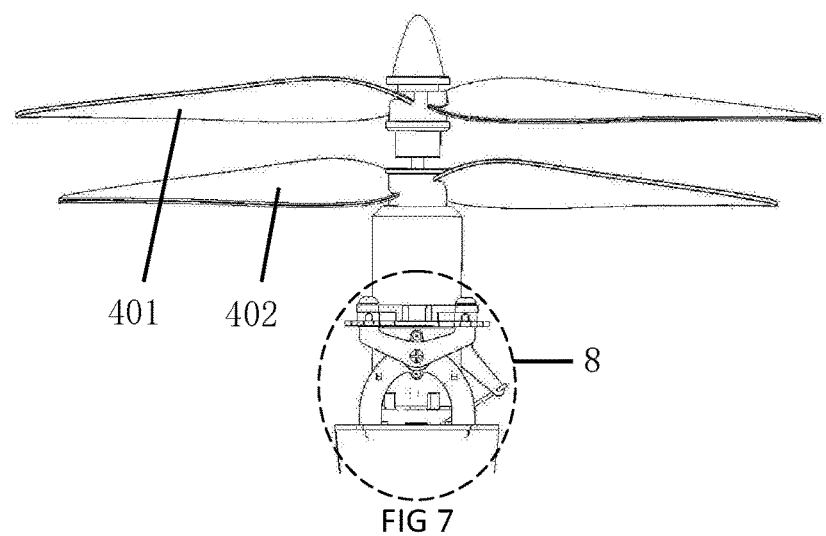
FIG. 7 shows a preferred thruster embodiment with contra-rotating propellers.
Figure 8:
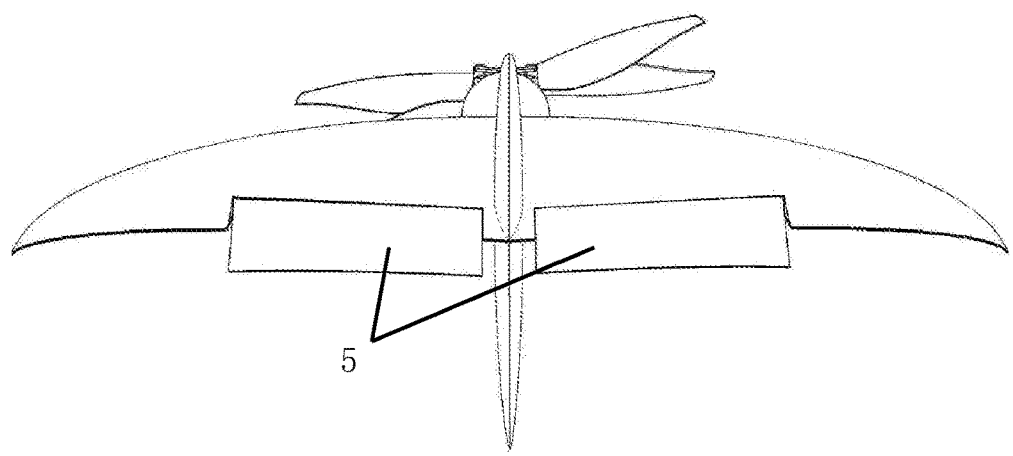
FIG. 8 illustrates a nose-down pitch-input via symmetric elevon deflection.
Figure 9:
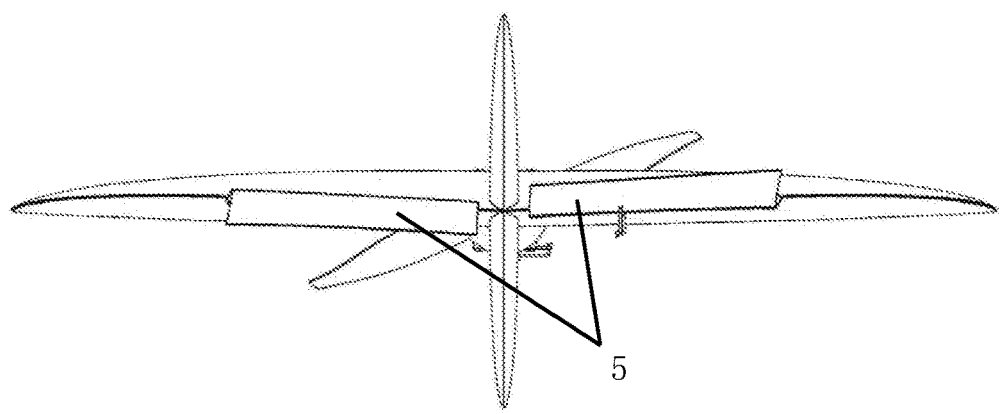
FIG. 9 illustrates a roll-right roll-input via differential elevon deflection.
Figure 10:
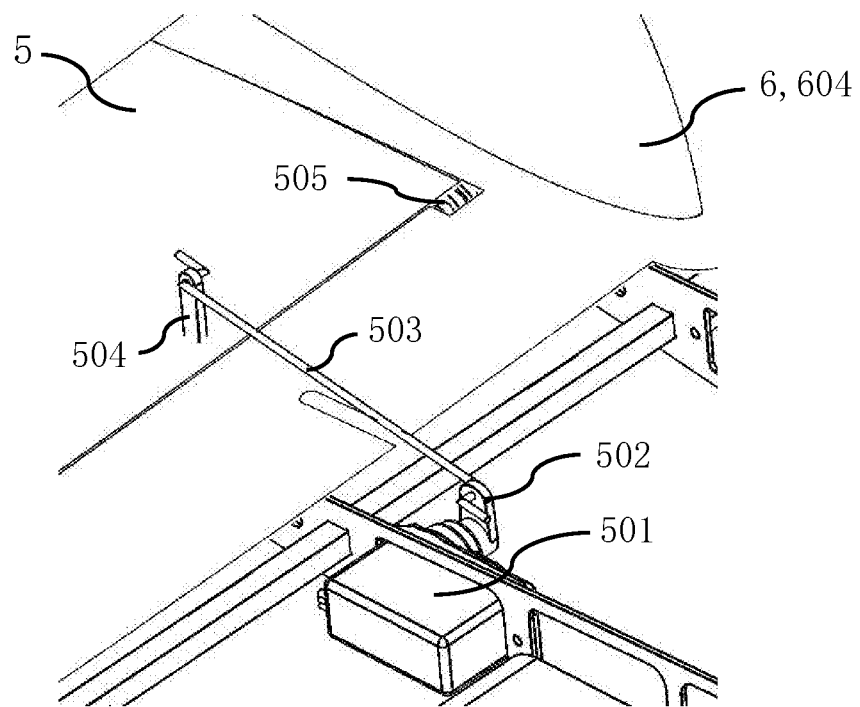
FIG. 10 is a perspective view with wing panel removed to illustrate elevon actuation.
Figure 11:
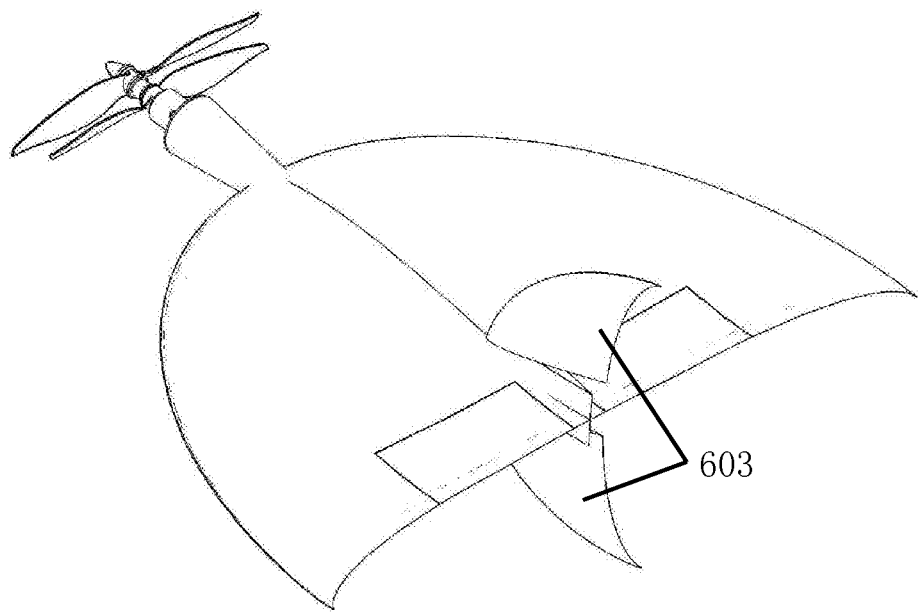
FIG. 11 is a perspective view illustrating fully-rotatable fins.

The term "plane of symmetry" is commonly-used and understood in aircraft textbooks; it applies even when there are minor deviations between the left and right halves of an aircraft (for example, if one side has a protruding pitot tube, but not the other). Note that for a monoplane or a tandem-wing the plane of symmetry for the wing and aircraft are necessarily parallel and coincident, so they are essentially the same plane. Bizarre designs could be conceived-of for which multiple non-tandem wings are utilized, or for which the aircraft has very significant asymmetry. For such cases the "plane of symmetry" should be interpreted as a vertical plane oriented parallel to the primary flight direction and coincident with the center of mass of the aircraft.

The term "fin" refers to a thin component or appendage that is attached to a larger body or structure, that when exposed to external flow (slipstream and/or freestream), functions as a foil that can enhance the ability to steer or stabilize motion while traveling on or through a fluid. With regard to aircraft the term "fin" suggests a near-vertical orientation (parallel to an aircraft's plane-of-symmetry to within +/−25 degrees), except when applied to missiles or rockets. Examples of fins include vertical stabilizers, winglets, and similar devices. Control surfaces are often attached to fins, especially rudders. Fins may be fully-rotatable or fixed. Fully-rotatable fins are also commonly referred-to as all-moveable fins, or all-moveable tails; they can rotate relative to a fixed-body whereas fixed-fins cannot.

The term "control surface" refers to moveable aerodynamic devices allowing adjustment and control of an aircraft's flight attitude. Control surfaces usually move by rotation about a hinge to induce moments about the center-of-mass of an aircraft to affect its orientation in yaw, pitch, and/or roll. Control surfaces are attached to a stationary part of an aircraft—for example to a fixed-wing or to a fixed-fin. Control surfaces include: rudders, ailerons, elevators, elevons, and the-like. For the purposes of this patent fins themselves are NOT control surfaces, regardless of whether the fins are fixed or fully-rotatable.

The term "sharpness" is commonly-understood. For rounded airfoil edges it can be quantified as the minimum radius of curvature expressed as a percentage of airfoil chord-length, where a smaller radius denotes a sharper edge. The sharpness of squared-off edges can be quantified as half the distance between the airfoil upper and lower surfaces at their aft-most chord-wise position expressed as a percentage of airfoil chord-length. The sharpness of a wing is referenced to its airfoils.

The term "outboard" refers to spanwise positions toward the wing tips; "inboard" refers to spanwise positions towards the wing root.

The term "root airfoil" refers to a wing's airfoil at its plane-of-symmetry. When an obstruction is present (like a fuselage or mount) "root airfoil" refers to the airfoil one would get at the wing plane-of-symmetry if unobstructed wing airfoils were extrapolated to the plane-of-symmetry based on their spanwise distribution of: shape, chord-length, thickness, twist angle, sweep angle, and other relevant parameters (i.e. dihedral angle).

Herein the term "washout" refers to "structural washout", which is a characteristic of aircraft wings whereby the wing is slightly twisted such that the angle of incidence is greater toward the wing root and decreases along the span, becoming lower toward the wing tips.

The term "thruster" refers to an element or a combination of elements used to produce thrust. It includes a variety of different aircraft propulsion systems, including: motors and propellers, jet engines, turbofan engines, rocket engines, etc.

The term "feet" refers to any part of an aircraft that contacts the ground in such a way as to enable the aircraft to stand in a predominantly upright orientation. This can include: wing-tips, fin-tips, wheels, legs, pads, pogo-style shock-absorbers, etc.

The term "fixed-wing" distinguishes a wing from rotors, propellers, and other spinning aerodynamic surfaces that are occasionally called "rotating wings" or "rotary wings". The term "fixed-wing" excludes flapping-wings and variable-sweep wings (aka "swing-wings"). Variable-sweep wings can change their sweep angle, fold, or collapse during flight.

The term "fillet" is commonly-used in computer-aided design (CAD) to refer to an operation, or the result of an operation, performed on an inner or an outer edge to create a more-rounded edge. This can be done by adding material to an inner edge or by removing material from an outer edge. The roundness of the edge is then characterized by its "fillet radius". Structurally, fillets applied to inner edges can reduce stress concentration and increase stiffness.

The term "near" is quantitatively defined herein for all applications that reference any part of a wing; "near" means that the distance between the closest point of the compared element to the referenced part of the wing is no greater than 25% of the root chord-length of the wing.

The term "flying-wing" is applied to aircraft consisting mainly of one large wing and having neither an empennage nor a traditional fuselage; the term "flying-wing" applies to blended wing-body aircraft.

An "empennage" is the tail assembly of an aircraft, which includes at least one: horizontal stabilizer, vertical stabilizer, elevator, and rudder.

The term "tail-sitter" refers to a kind of aircraft that can takeoff from a position in which the aircraft is standing upright on its feet, and where the aircraft can then tilt from a predominantly vertical to a predominantly horizontal orientation for forward flight.

The terms "effective camber" and "effective angle of attack" are explained. An airfoil with a deflected flap can be conceptualized differently. When a flap is deflected downward one can imagine the system as an airfoil with its camber-line bending about the flap hinge, which results in an increased "effective camber". The trailing edge of the airfoil moves downward causing the chord-line to deflect such that, all-else being equal, the airfoil's "effective angle of attack" increases.

The phrase "substantially crescent-shaped planform" is broadly interpreted to encompass all wing planforms that are crescent-shaped or a reasonable approximation to a crescent-shape. This may include, for example, multi-segmented linearly-tapered planforms that approximate a crescent.

LIST OF REFERENCE NUMBERS

1 - wing;
101 - leading-edge (of wing);
102 - trailing-edge (of wing);
103 - airfoil;
104 - leading-edge (of airfoil);
105 - trailing-edge (of airfoil);
106 - thickness;
107 - chord-length;
108 - camber-line;
109 - wing rib;
110 - wing spar;
111 - wing skin;
112 - center-of-mass;
113 - yawing moment;
114 - plane of symmetry;
115 - horizontal plane;
116 - hinge axis;
117 - hinge axis angle;
118 - panel;
119 - twist angle;
120 - quarter-chord line;
121 - relative wind;
122 - weight;
123 - sweep angle;
124 - chord-line;
125 - camera;
126 - pitot tube;
2 - thruster;
201 - slipstream;
202 - thrust;
203 - line of action;
204 - normal force;
3 - motor;
301 - aft motor;
302 - forward motor;
4 - propeller;
401 - leading propeller;
402 - trailing propeller;
5 - elevon;
501 - elevon servo;
502 - elevon servo horn;
503 - elevon push-pull rod;
504 - elevon control horn;
505 - elevon hinge;
6 - fin;
601 - lateral force;
602 - vertical axis;
603 - fully-rotatable fin;
604 - fin skin;
7 - foot;
8 - mount;
801 - gap;
802 - pin anchor;
803 - pin;
804 - servo;
805 - servo horn;
806 - control horn;
807 - push-pull rod;
808 - frame;
809 - rib;
810 - stringer;
811 - mount skin;
812 - locking-pin holes;
813 - aft mount;
814 - aft upper plate;
815 - aft lower plate;
816 - hinge hole;
817 - forward mount;
818 - forward upper plate;
819 - forward lower plate;
820 - central hole;
821 - bearing retention cover;

822 - top bearing;
823 - bottom bearing;
824 - support;
825 - toothed element;
826 - meshing toothed element;
827 - hinge bolt;
828 - attachment hole;
829 - holes;
830 - servo plate;
831 - forward mounting plate;
832 - aft mounting plate;
833 - spanwise rods;
834 - locking pins;
835 - fillet;
836 - threaded portion;
837 - smooth portion;
838 - head;
9 - antenna.

Control System

Competing fixed-wing vertical-takeoff-and-landing control systems use many actuators for control. Some embodiments of the presently invented control system provide full and effective three-axis control using just three actuators: one servo (501) for each elevon (5), and one servo (804) for the mount (8).

Embodiment A

Figure 14:
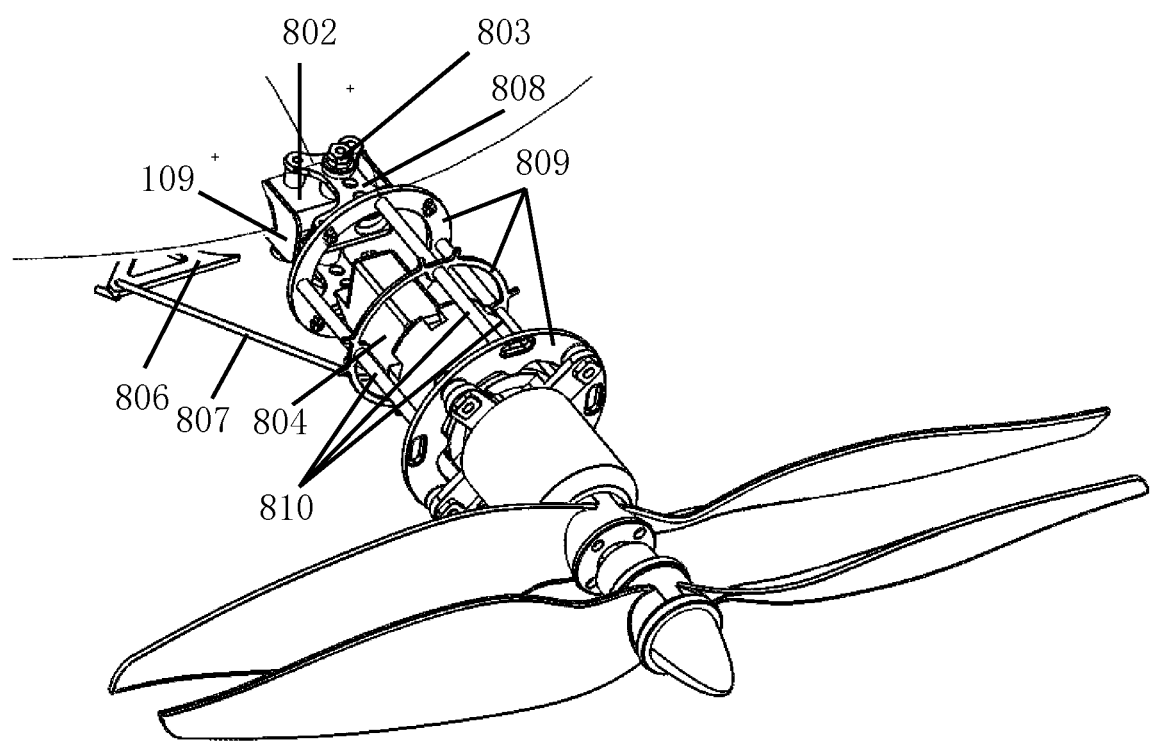
FIG. 14 is a perspective view of the Embodiment A mount with skin removed.
Figure 16:
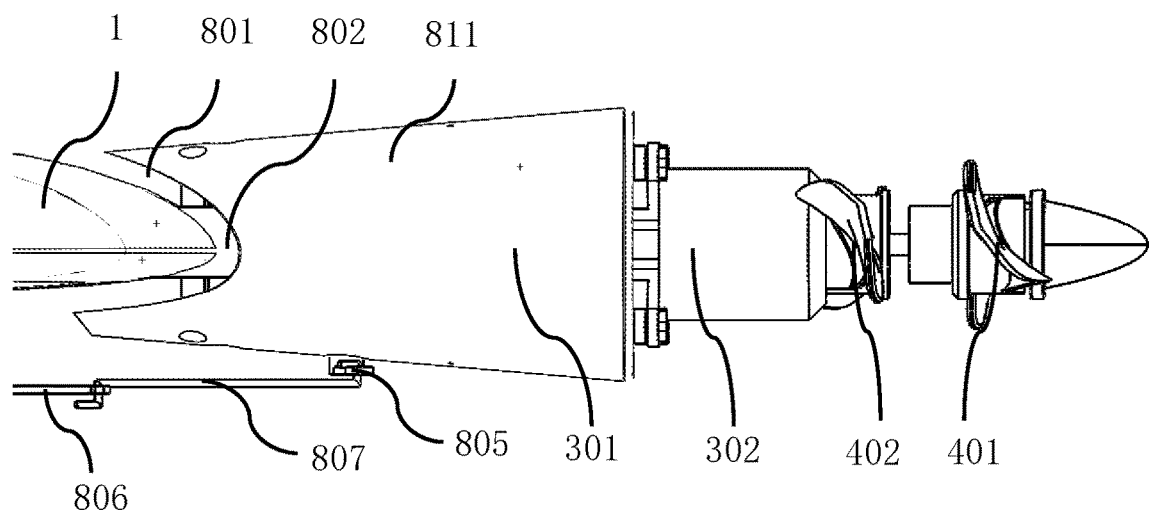
FIG. 16 is a sideview of the Embodiment A mount.

An example embodiment of the control system is provided with various features and parts, as described in BRIEF SUMMARY OF THE INVENTION. For Embodiment A, the mount (8) is a nacelle-like structure that protrudes forward from the root leading-edge of the fixed-wing (1), as seen in FIG. 1. When the mount (8) is in its neutral position, it lies on the plane of symmetry (114), and it may or may not be coaxial with the root chord-line of the fixed-wing (1). A preferred structure for the mount (8) is depicted in FIG. 14. It comprises: a plurality of frames (808), a plurality of ribs (809), a plurality of stringers (810), and skin (811) that can support loads, as seen in FIG. 16. The stringers (810) pass through corresponding holes cut into the ribs (809). Protrusions on the frames (808) pass through corresponding holes in the aftmost rib (809). The stringers (810), ribs (809), and frames (808) are joined together, preferably with adhesive. Skin (811) is placed around the ribs (809) and may be joined to the ribs, preferably using adhesive.

Figure 15:
FIG. 15 shows the pin used for the Embodiment A mount.

The mount (8) is connected to the fixed-wing (1) using a pin (803) that passes through holes in two frames (808) and through a pin anchor (802) that is fixed to the fixed-wing (1). The pin (803) is shown in FIG. 15. The pin anchor (802) is attached to the fixed-wing (1) near its leading-edge (101), as seen in FIG. 16, and the pin anchor (802) lies on the plane-of-symmetry (114). The pin anchor (802) may be secured to the fixed-wing (1) using two spanwise rods (833) that run spanwise through the pin anchor (802) and two adjacent wing ribs (107). Adhesive is used to join the wing ribs (107), pin anchor (802), and spanwise rods (833).

The mount (8) rotates in a substantially horizontal plane (115) about the pin (803); the pin (803) is oriented along the hinge axis (116) and located near the leading-edge (101) of the fixed-wing (1). The pin (803) connects the mount (8) to the pin anchor (802) and allows the mount (8) to rotate relative to the pin anchor (802) about the hinge axis (116). There is a gap (801) to provide clearance between the mount (8) and the leading-edge (101) of the fixed-wing (1, FIG. 16) to prevent interference during mount rotation.

Embodiment A also comprises: a servo (804), servo horn (805), control horn (806), and a push-pull rod (807). The servo (804) is attached to the mount (8) or to the fixed-wing (1) near its leading-edge (101). The servo horn (805) is attached to and driven by the servo (804). The control horn (806) is attached to the fixed-wing (1) near its leading edge (101), or to the mount (8), whichever is opposite the servo horn (805). One end of the push-pull rod (807) is attached to the servo horn (805) and the other end of the push-pull rod (807) is attached to the control horn (806).

Figure 12A:
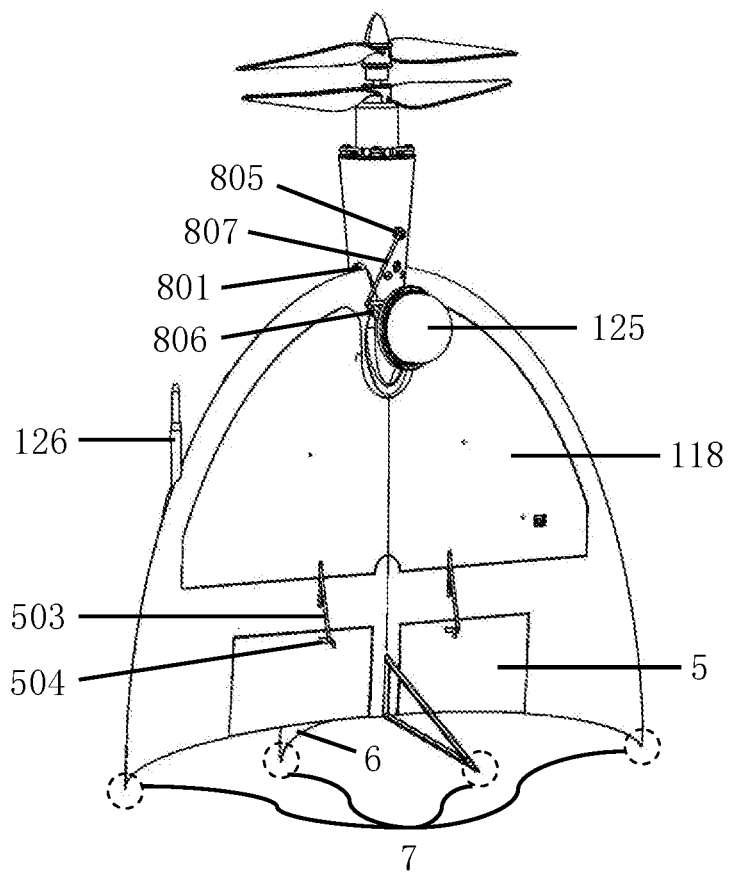
FIG. 12A is a perspective view of a one-fin embodiment of the aircraft while tail-sitting.
Figure 12B:
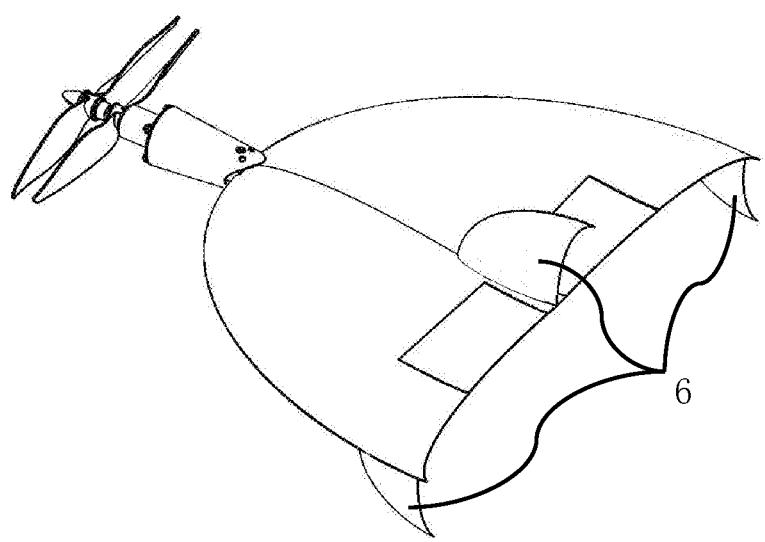
FIG. 12B is an example embodiment of the aircraft with three fins.
Figure 13:
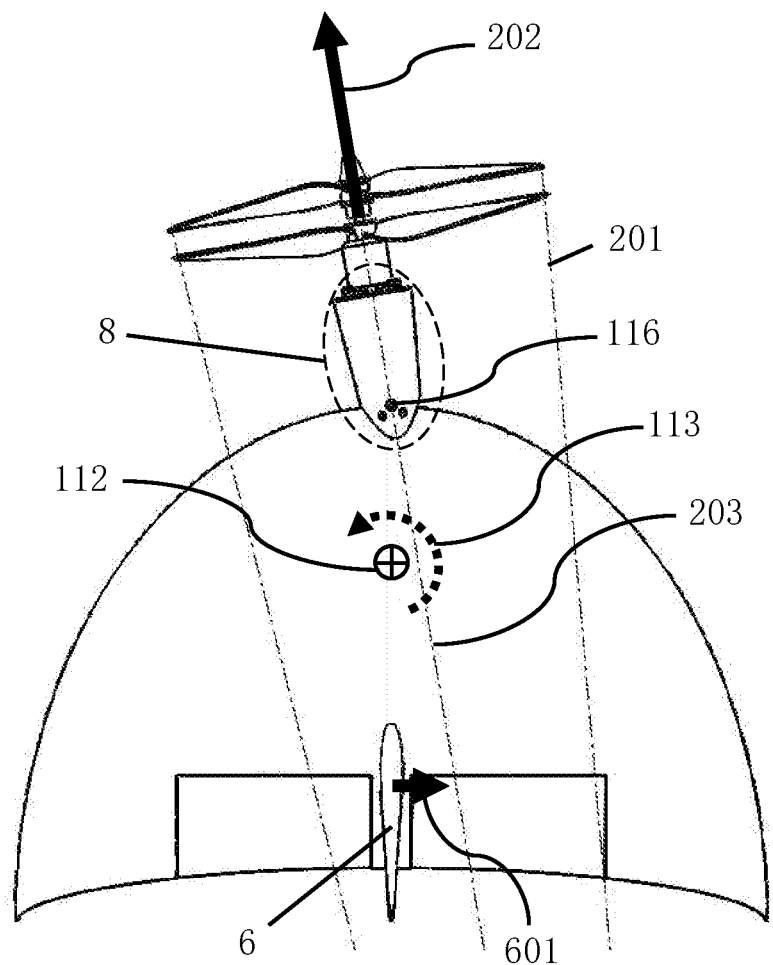
FIG. 13 is a planform view of the aircraft illustrating yaw-control methodology.
Figure 17:
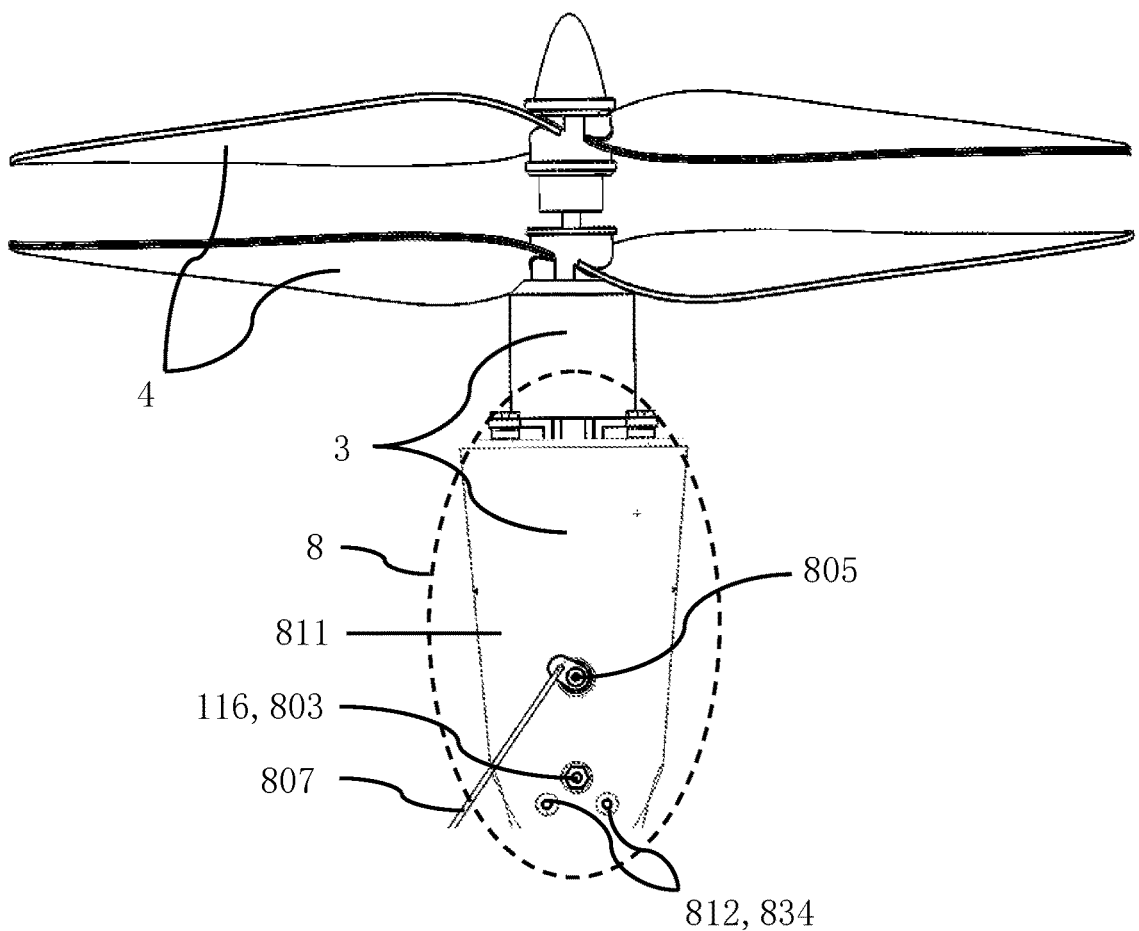
FIG. 17 is a bottom view of the Embodiment A mount.

When the servo (804) is attached to the mount (8), it will rotate with the mount (8). In this case, it makes sense to avoid flow obstruction by locating the servo (804) within the skin (811) of the mount (8). FIG. 17 depicts the servo horn (805) protruding out of the skin of the mount. Alternatively, a slit may be placed in the skin (811) and an L-bend introduced into the rod (807) such that only the push-pull rod (807) protrudes out of the skin, as for the elevons (5) in FIG. 12A. When motors (3) that contra-rotate are used, the aft motor (301) can be housed within the mount skin (811), and the forward motor (302) can protrude ahead of the mount (8), as depicted in FIG. 16. The forward motor (301) drives the trailing propeller (402) and the aft motor (301) drives the leading propeller (401).

Embodiment A has a fairly clean-looking and simple mount design, but the design comes with drawbacks. One drawback is that the thruster (2) is typically heavy and the thruster's center-of-mass is located far away from the hinge axis (116), which for Embodiment A is near the leading-edge (101) of the fixed-wing (1). Therefore, achieving high rotational accelerations of the mount (8) and attached thruster (2) requires a relatively large, strong, and heavy servo (804).

There is also a reactionary moment transferred to the fixed-wing (1), which causes the fixed-wing (1) to jerk opposite the direction of mount rotation and opposite the desired yawing direction. This must be considered on a case-by-case basis in light of: the mass of the fixed-wing (1), mass of the thruster (2), relevant moment arms and target rotational accelerations. When inappropriately applied Embodiment A can cause an aircraft to noticeably yaw back-and-forth during hovering in mild-to-moderate winds, which can be a nuisance for First Person View (FPV) pilots who look through an onboard camera during flight.

Embodiment A designers must also be careful and consider what aircraft the control system is being applied to. For Embodiment A very large forces can be transmitted through the push-pull rod (807) during accidental tip-overs and potential skid-landings. These forces can break the servo (804) loose from the mount (8), or strip its gears. Locking pin-holes (812) are provided in the frames (808) and pin anchor (802) into which locking pins (834) can be inserted (FIGS. 14 and 17). The locking pins (834) and holes (812) prevent the mount (8) from rotating with respect to the fixed-wing (1), which protects the servo (804) and its gears from accidental damage during aircraft storage, handling, and transportation. Metal gear servos are recommended.

Embodiment B

Figure 18:
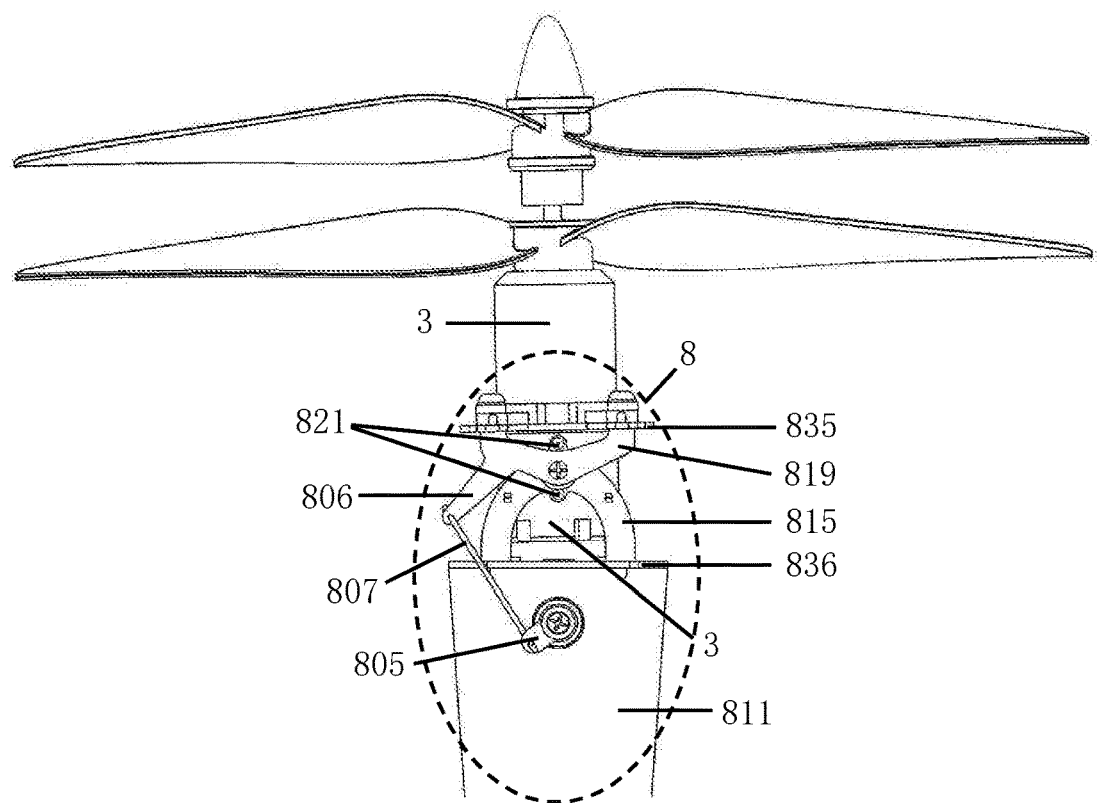
FIG. 18 is a bottom view of the Embodiment B1 mount.

Another example of the control system is provided in Embodiment B, which follows from the discussion in BRIEF SUMMARY OF THE INVENTION. Embodiment B is depicted in FIG. 18. It can be used when Embodiment A is inappropriate to a given application. Rather than rotating about a pin (803) near the leading-edge of the wing (101) the hinge axis (116) is moved until it is nearly coincident with the thruster's (2) center-of-mass. As a result, high rotational accelerations about the hinge axis (116) can be achieved using a smaller and lighter-weight servo (804) that better-resists breaking during tip-overs and potential skid-landings. Yaw-jerking becomes negligible as reactionary moment about the fixed-wing (1) is minimized.

Figure 19:
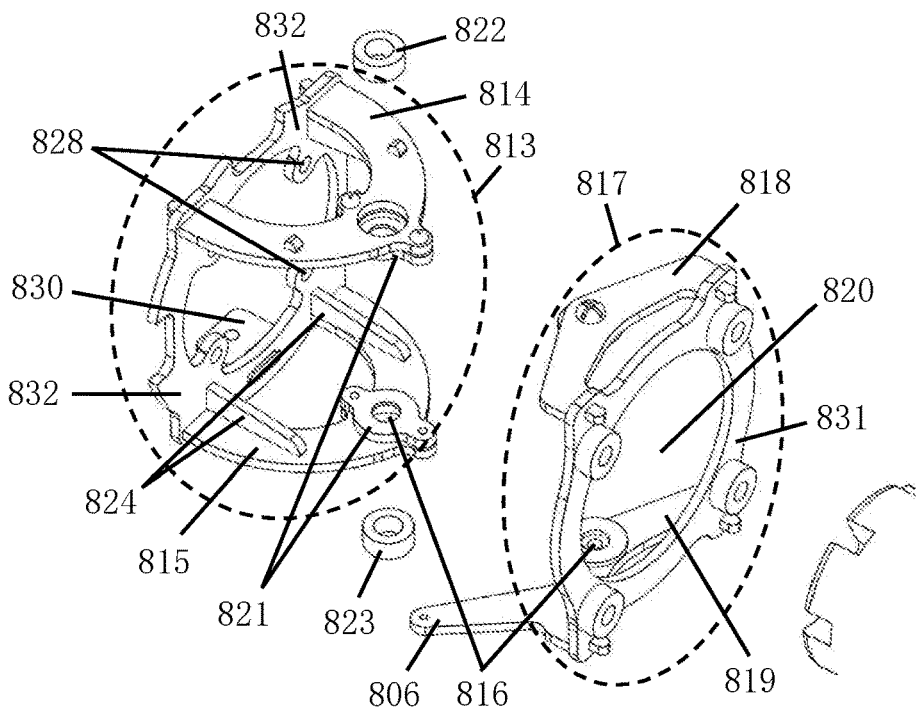
FIG. 19 is an exploded view of the Embodiment B1 mount.

For Embodiment B the mount (8) comprises an aft mount (813) and a forward mount (817), as seen in FIG. 19. The aft mount (813) is fixed to the aircraft. The aft mount (813) comprises an aft mounting plate (832), which is located on a fixed-part of the aircraft, like a fixed-wing (1), fuselage, or fixed-nacelle. An aft upper plate (814) and an aft lower plate (815) are located on the aft mounting plate (832) and extend forward with respect to the aft mounting plate (832). The aft upper plate (814) and the aft lower plate (815) each include a hinge hole (816).

Similarly, the forward mount (817) comprises a forward mounting plate (835) on which a forward upper plate (818) and a forward lower plate (819) are located. The forward upper plate (818) and the forward lower plate (819) extend rearward with respect to the forward mounting plate (835). The forward upper plate (818) and the forward lower plate (819) each include a hinge hole (816).

There are four hinge holes (816) on the mount (8). There is a hinge hole on the: forward upper plate (818), forward lower plate (819), aft upper plate (814), and aft lower plate (815). The four hinge holes (816) are concentric with each other. The hinge axis (116) passes through the center of the hinge holes (816). The forward mount (817) rotates with respect to the aft mount (813) about the hinge axis (116) to facilitate aircraft yaw control.

Embodiment B is depicted with two coaxial counter-rotating motors (3) that are attached to the forward mount (817) and which rotate with the forward mount (817) about the hinge axis (116). More specifically, the motors (3) are fixed to the forward mounting plate (835). The forward mounting plate (835) is provided with a large central hole (820); one of the motors (3) passes through the large central hole (820).

Figure 20:
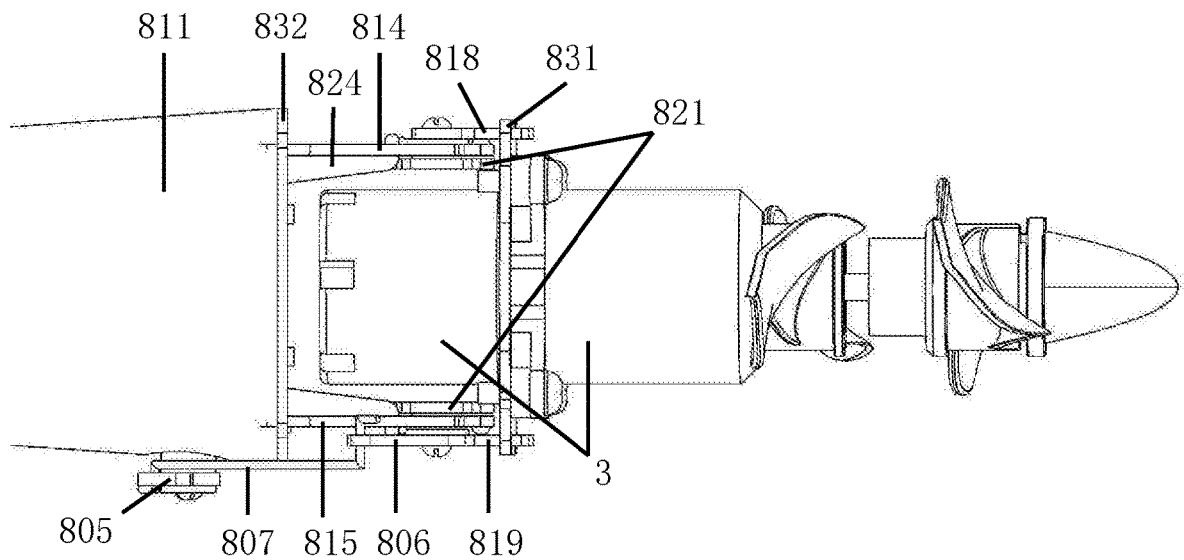
FIG. 20 is a side-view of the Embodiment B1 mount.
Figure 21:
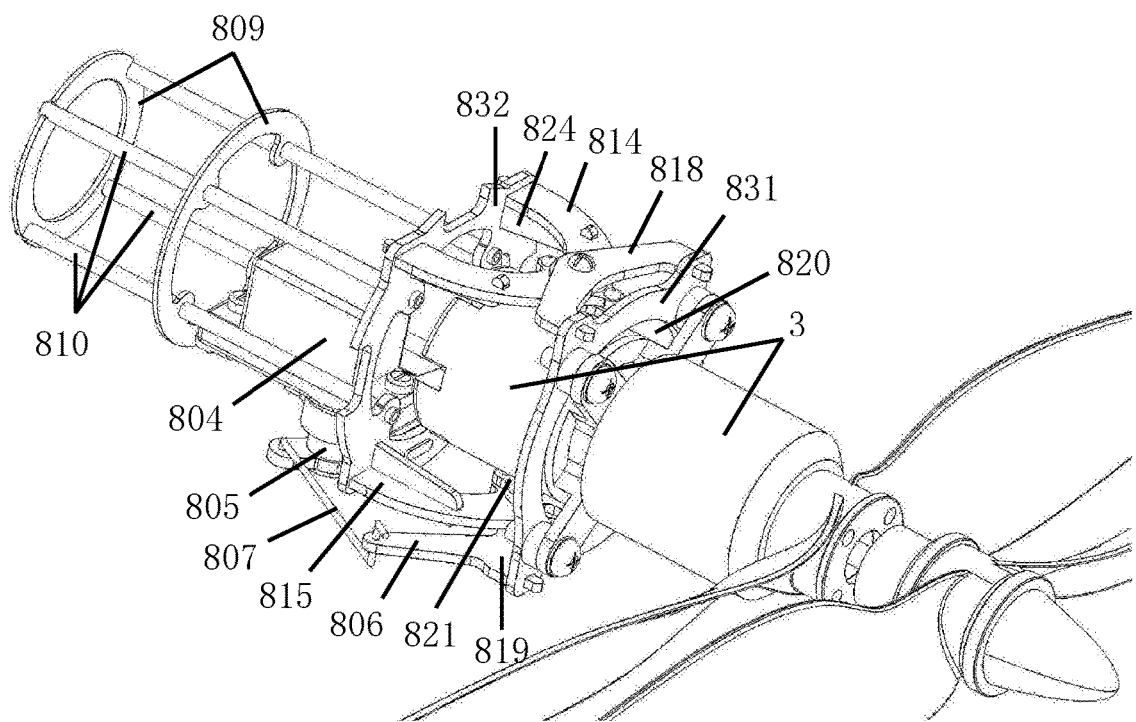
FIG. 21 is a perspective view of the Embodiment B1 mount with skin removed.

Similarly to Embodiment A, Embodiment B utilizes a servo (804), a servo horn (805), a control horn (806) and a push-pull rod (807), as seen in FIGS. 18 and 20. It is sensible for the servo (804) to be attached to the mount (8) and located within the mount skin (811), preferably very close to the aft mounting plate (836), as shown in FIG. 21. The servo horn (805) attaches to the servo (804). The control horn (806) is located on the forward mount (817), preferably on its forward upper plate (818) or forward lower plate (819). The control horn (806) can be integrated into the forward mount (817), or attached as a separate part. One end of the push-pull rod (807) is attached to the servo horn (805) and the other end of the push-pull rod is attached to the control horn (806). Forces exerted on the push-pull rod (807) cause the forward mount (817) to rotate with respect to the aft mount (813).

Embodiment B may use bearings to smooth rotation of the forward mount (817) with respect to the aft mount (813) while reducing friction, wear, and slop. The bearings may include an upper bearing (822) and a lower bearing (823). The upper bearing (822) is held between a bearing retention cover (821) and either the aft upper plate (814) or the forward upper plate (818) using threaded fasteners, as seen in FIG. 19. Similarly, the lower bearing (823) is held between a bearing retention cover (821) and either the aft lower plate (815) or the forward lower plate (819) using threaded fasteners. A threaded aluminum sleeve is press-fit into the center hole of the upper bearing (822) and the lower bearing (823). The bearings (822, 823) can be aligned with the hinge holes (816) and then the aft and forward mounts (813, 817) can be assembled together and held in-place using threaded fasteners screwed through plates (814, 815, 818, 819) and into the threaded aluminum sleeves with the bearings held between the plates (818, 814 and 819, 815).

Embodiment B1

It is convenient to manufacture the mount (8) by cutting components out of a flat plate of material using a CNC machine. This allows materials with high strength-to-weight ratios to be used, including fiberglass and carbon fiber. Thin flat material oriented approximately parallel to a horizontal plane is not very resistant to bending from applied vertically-oriented forces. Therefore, supports (824) that lie within planes approximately perpendicular to the horizontal plane (115) may be included. The supports (824) can help the plates (814, 815, 818, 819) resist bending stresses, as seen in FIGS. 19-21. Supports (824) connect-to, or are integrated-with, a mount (813, 817) and its plates (814, 815, 818, 819).

Embodiment B2

Plastic is a good material choice when a lower strength-to-weight ratio is tolerable for the mount (8). Embodiment B2 (FIG. 22) depicts a mount (8) made using injection-molded plastic. The aft mount (813) is made as one part. The aft mounting plate (836) and aft upper and lower plates (814, 815) are integral. Corresponding hinge holes (816) and attachment holes (828) do not require separate cutting. Supports (824) and fillets (835, see DEFINITIONS) are used as-needed. Similarly, the front mount is made as one part. The forward mounting plate (835), forward upper plate (818) forward lower plate (819), and control horn (806) are integral. Supports (824) and fillets (835) are used as-needed.

Figure 22:
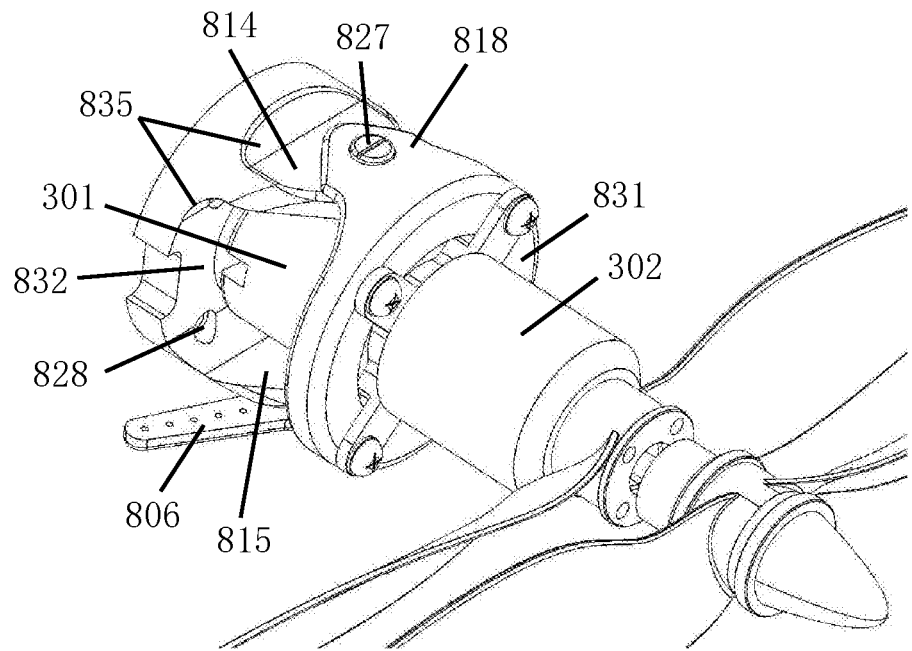
FIG. 22 is a perspective view of the Embodiment B2 mount.
Figure 23:
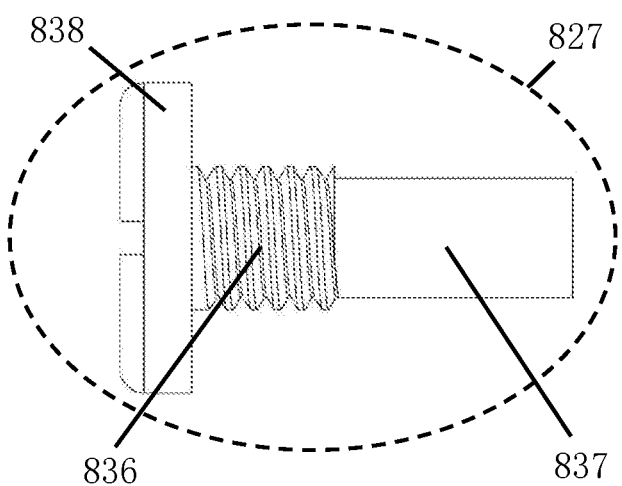
FIG. 23 depicts a novel hinge-bolt for use with the mount.
Figure 24:
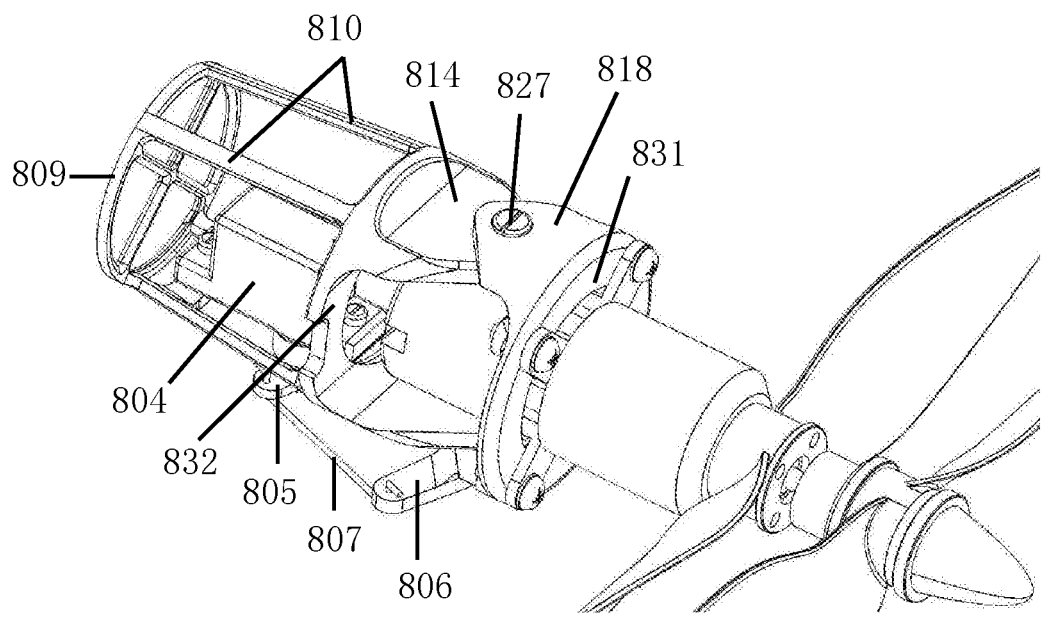
FIG. 24 is a perspective view of the Embodiment B3 mount.
Figure 25:
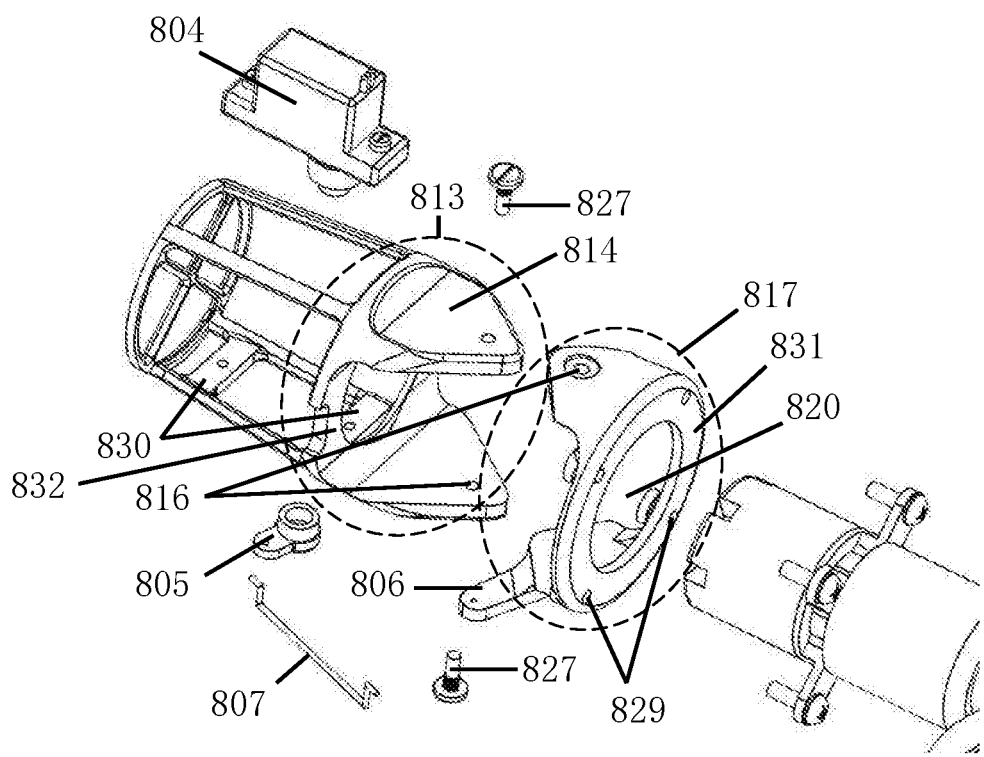
FIG. 25 is a perspective view of the Embodiment B3 mount.

An upper bearing (822) and a lower bearing (823) are optional. When the upper bearing (822) and the lower bearing (823) are used, it is convenient to integrate the bearing retention covers (821) into the forward or aft mount (817, 813) such that they are not separate and do not require threaded fasteners. Omitting the upper bearing (822) and the lower bearing (823) hastens production and reduces cost, in which case it is convenient to employ a hinge bolt (827), as depicted in FIG. 23. The hinge bolt (827) is novel. It has a threaded portion (836) and a smooth portion (837), as well as a head (838). The threaded portion (836) engages either the forward or aft mount (817, 813) by screwing-into its plastic hinge holes (816), while the smooth portion (837) engages the opposite mount by insertion into its hinge holes (816). This allows the forward mount (817) to freely rotate with respect to aft mount (813). The threaded portion (836) is closest to the head of the hinge bolt (827), and the threaded portion (836) has a larger outer-diameter than the smooth portion (837) which allows hinge bolts (827) to be used to attach and detach the forward mount (817) to-and-from the aft mount (813) even while a thruster (2) with an aft motor (301) is installed on the front mount (817) and while the push-pull rod (807) is still connected to the servo horn (805) and to the control horn (806)—in this situation the hinge bolts (827) can be screwed from outside without the need to place a tool on the inside where the aft motor (301) blocks access (FIG. 22).

Embodiment B3

3D printing provides another sensible mount fabrication option. In this case the aft mount (813) can be 3D-printed and combined and made integral with servo plates (830), ribs (809), and stringers (810). The stringers (810) provide a large surface area for adhesion with load-bearing composite skin (811). The servo plates (830) make servo (805) installation easy to reduce human assembly time.

To reduce or prevent damage to the aforementioned components (831, 809, 810, 811, 805) during an accidental collision, the hinge bolt (827) can be designed to fail before the rest of the structure; hinge bolts (827) are easily replaced.

Embodiment C

Figure 26:
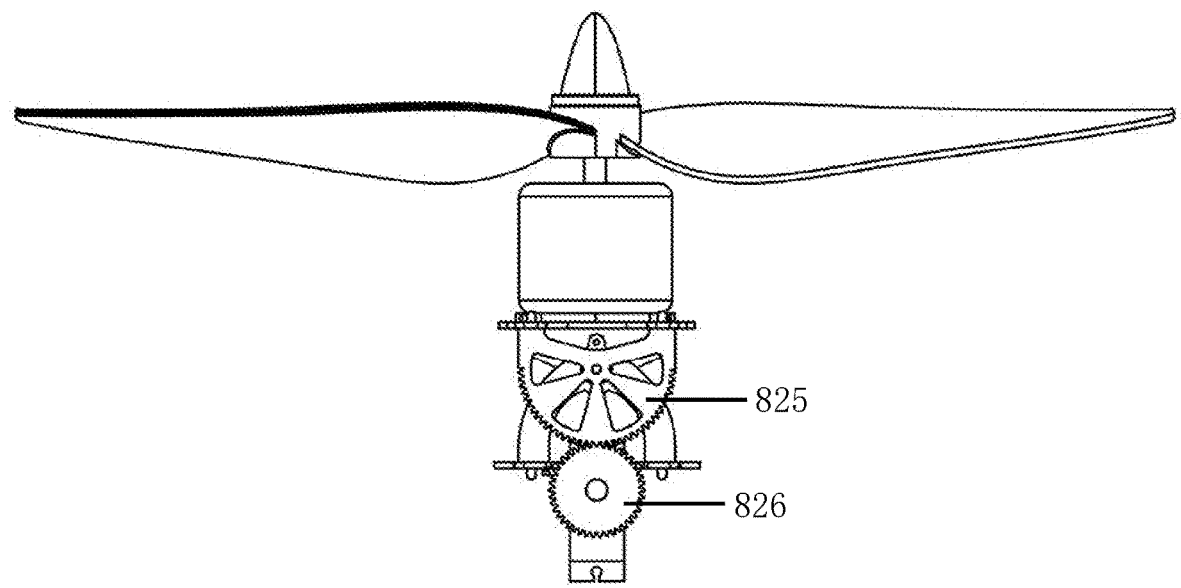
FIG. 26 is a bottom view of the Embodiment C mount.

Embodiment C is provided as an example whose thruster (2) comprises just one motor (3) and propeller (4), and whose mount actuation system does not use push-pull rods (807). Instead, Embodiment C uses a toothed element (825) attached to the forward mount (817) as depicted in FIG. 26. A meshing toothed element (826) meshes into the toothed element (825). The rotation of the meshing toothed element (826) is designed to drive rotation of the toothed element (825), which causes rotation of the forward mount (817) with respect to the aft mount (813) about the hinge axis (116).

Prototypes

The aircraft and embodiments A and B of the control system have been modeled in flight simulation software, undergone detailed-design, have been prototyped, and have successfully flown. They are more gust-sensitive than multi-rotors of a similar size, but possess the same VTOL, hovering, and video acquisition capabilities while demonstrating significantly improved range, endurance, and flight speed.

Disclaimer

While the foregoing written description enables a person having ordinary skill in the art to make and use what is considered presently to be the best modes thereof, those of ordinary skill in the art will understand and appreciate the existence of variations, combinations, and equivalents of the specific embodiments, processes, and examples herein. The invention should therefore not be limited by the above described embodiments, processes, and examples, but by all embodiments and processes within the scope and spirit of the invention.

Figure 27:
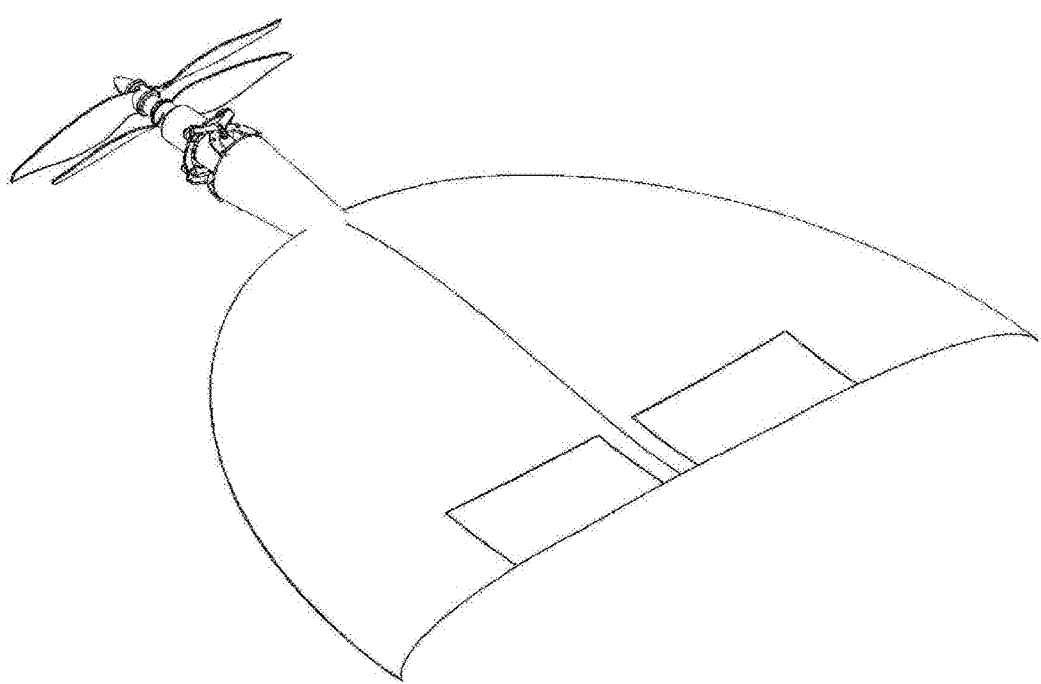
FIG. 27 is a perspective view of an embodiment having no fins.

Novel elements of the invention include the aircraft as configured, as well as its control system. While the control system is designed with a particular category of aircraft in mind it can be applied to a wide variety of different aircraft, including: conventional planes, jets, biplanes, tandem-wings, flying-wings, blended wing-body planes, etc. The control system applied to a different category of plane than is herein described is nonetheless understood to fall within the scope of this invention. The control system can also be applied to an aircraft that has no fins (FIG. 27) if the aircraft utilizes a flight controller that is suitable to ensure lateral stability.

Variations of the novel apparatus above presented may utilize different means of mount actuation. The associated mechanisms may include: pulleys, toothed pulleys, sprockets, gears, ropes, cables, belts, or chains. The driving element could be: people, electric motors, or engines. Driving energy might be stored in: batteries, liquid fuel, muscles, or even springs. The thruster itself could be: a rocket, a fan, a jet engine, etc. Such combinations can be considered to fall within the scope and spirit of the novel apparatus presented above.

SEQUENCE LISTING

Not Applicable

Aircraft

The invention claimed is:

1. A control system for aircraft with at least one fixed-wing (1), the control system comprising:
   a mount (8);
      (i) where the mount (8) is located forward of the wing's (1) leading-edge (101);
      (ii) where the mount (8) lies on the plane of symmetry (114);
   a thruster (2);
      (iii) where the thruster (2) is attached to the mount (8);
   a horizontal plane (115);
      (iv) where the horizontal plane (115) is perpendicular to the aircraft's plane-of-symmetry (114) and coincident with the leading edge (104) of the wing's root airfoil and the trailing edge (105) of the wing's root airfoil;
   a hinge axis (116);
      (v) where the hinge axis (116) is approximately perpendicular to the horizontal plane (115) such that the axis angle (117) between the horizontal plane (115) and the hinge axis (116) is between 65 and 115 degrees;
   where the thruster (2) rotates about the hinge axis (116); and
   a fin (6);
      where the fin (6) does not have an attached control surface;
      where the fin (6) does not rotate with respect to the fixed-wing (1);
      where the fin (6) lies on the plane of symmetry (114), aft of the aircraft's center-of-mass (112), and within the thruster's (2) slipstream (201).

2. The control system for aircraft according to claim 1, further characterized by:
   where the thruster (2) does not rotate about another axis except the hinge axis (116).

3. The control system for aircraft according to claim 1, wherein the thruster (2) comprises:
   (i) two motors (3);
   (ii) two propellers (4), each of the two propellers comprising:
      (1) a leading propeller (401); and
      (2) a trailing propeller (402);
   (iii) where the two motors (3) and two propellers (4) are coaxial;
   (iv) where the two motors (3) and two propellers (4) are counter-rotating, where the two propellers (4) are fixed-pitch.

4. The control system for aircraft according to claim 1, the control system further comprising:
   elevons (5);
   where the elevons (5) are designed to deflect symmetrically for pitch-control;
   where the elevons (5) are designed to deflect differentially for roll-control;
   where the elevons (5) are of approximately equal size and shape;
   where the elevons (5) are symmetrically-located about the plane of symmetry (114);
   where the elevons (5) are partially or wholly located within the thruster's (2) slipstream (201).

5. The control system for aircraft according to claim 1, further characterized by:

the aircraft being unmanned;
the aircraft being of a flying-wing design;
the aircraft being of a tail-sitter design.

6. The control system for aircraft according to claim 1, the control system further comprising:
   a gap (801);
   where the gap (801) provides clearance between the mount (8) and the leading-edge (101) of the fixed-wing (1) to prevent interference during mount rotation;
   a pin anchor (802);
      (i) where the pin anchor (802) is located near the leading-edge (101) of the wing (1);
      (ii) where the pin anchor (802) lies on the plane-of-symmetry (114);
   a pin (803), which:
      (iii) is oriented along the hinge axis (116);
      (iv) is located near the leading-edge (101) of the fixed-wing (1);
      (v) connects the mount (8) to the pin anchor (802); and
      (vi) whereby the pin (803) allows the mount (8) to rotate relative to the pin anchor (802) about the hinge axis (116).

7. The control system for aircraft according to claim 1, the control system for aircraft further comprising:
   a servo (804);
   a servo horn (805);
   a control horn (806);
   a push-pull rod (807);
   where the servo (804) is attached to the mount (8) or to the fixed-wing (1) near its leading edge (101),
   where the servo horn (805) is attached to the servo (804),
   where the control horn (806) is attached to the fixed-wing (1) near its leading edge (101) or to the mount (8),
   where one end of the push-pull rod (807) is attached to the servo horn (805) and the other end of the push-pull rod (807) is attached to the control horn (806).

8. The control system for aircraft according to claim 1, wherein the mount (8) comprises:
   a forward mount (817), the forward mount (817) comprising:
      (i) a forward mounting plate (831);
      (ii) a forward upper plate (818); and
      (iii) a forward lower plate (819);
      (iv) where the forward upper plate (818) and forward lower plate (819) are located on the forward mounting plate (831) and extend rearward with respect to the forward mounting plate (835);
   an aft mount (813), the aft mount (813) comprising:
      (v) an aft mounting plate (832);
      (vi) an aft upper plate (814);
      (vii) an aft lower plate (815);
      (viii) where the aft upper plate (814) and aft lower plate (815) are located on the aft mounting plate (832) and extend forward with respect to the aft mounting plate (832); and
      (ix) where the aft mount (813) is fixed to the aircraft;
   hinge holes (816), where a hinge hole (816) is located on:
      (x) the forward upper plate (818),
      (xi) the forward lower plate (819),
      (xii) the aft upper plate (814),
      (xiii) the aft lower plate (815),
      (xiv) where the hinge holes (816) are concentric with each other,
   where the hinge axis (116) passes through the center of the hinge holes (816), where the forward mount (817) is designed to rotate with respect to the aft mount (813) about the hinge axis (116) to facilitate aircraft yaw control.

9. The control system for aircraft according to claim 1, the control system further comprising two motors (3);
   where the motors (3):
      (i) are coaxial,
      (ii) counter-rotating,
      (iii) attached to the forward mount (817),
      (iv) are designed to rotate with the forward mount (817) about the hinge axis (116), wherein the forward mounting plate (831) comprises:
      (v) a central hole (820);
      (vi) where one of the motors (3) passes through the central hole (820).

10. The control system for aircraft according to claim 1, the control system further comprising:
    a servo (804);
    a servo horn (805);
    a control horn (806);
    a push-pull rod (807);
    where the servo (804) is attached to the mount (8) and located within its skin (811);
    where the servo horn (805) attaches to the servo (804);
    where the control horn (806) is located on the forward mount (817);
    where one end of the push-pull rod (807) is attached to the servo horn (804) and the other end of the push-pull rod (807) is attached to the control horn (806);
    where forces exerted on the push-pull rod (807) by the servo (804) cause the forward mount (817) to rotate with respect to the aft mount (813).

11. The control system according to claim 8, further comprising:
    a hinge bolt (827);
    where the hinge bolt (827) comprises:
       (i) a threaded portion (836);
       (ii) a smooth portion (837);
       (iii) a head (838);
    where the threaded portion (836) is closer to the head (838) of the hinge bolt (827) than the smooth portion (837);
    where the threaded portion (836) has a larger outer-diameter than the smooth portion (837);
    where the threaded portion (837) engages either the forward (817) or aft (813) mount by screwing-into its hinge holes (816);
    where the smooth portion engages the opposite mount (813, 817) by insertion into its hinge holes (816);
    where the forward mount (817) can rotate with respect to the aft mount (813).

12. The control system according to claim 8, wherein the fin (6) is approximately symmetric about the horizontal plane (115) such that it extends both above and below the fixed wing (1).

13. A control system for aircraft with at least one fixed-wing (1), the control system comprising:
    a mount (8);
       (i) where the mount (8) is located forward of the wing's (1) leading-edge (101);
       (ii) where the mount (8) lies on the plane of symmetry (114);
    a thruster (2);
       (iii) where the thruster (2) is attached to the mount (8);
       where the thruster (2) does not rotate about another axis except the hinge axis (116), wherein the thruster (2) comprises:

(i) two motors (3);
(ii) two propellers (4), each of the two propellers comprising:
  (1) a leading propeller (401); and
  (2) a trailing propeller (402);
(iii) where the two motors (3) and two propellers (4) are coaxial;
(iv) where the two motors (3) and two propellers (4) are counter-rotating, where the two propellers (4) are fixed-pitch;

a horizontal plane (115);
(iv) where the horizontal plane (115) is perpendicular to the aircraft's plane-of-symmetry (114) and coincident with the leading edge (104) of the wing's root airfoil and the trailing edge (105) of the wing's root airfoil;

a hinge axis (116);
(v) where the hinge axis (116) is approximately perpendicular to the horizontal plane (115) such that the axis angle (117) between the horizontal plane (115) and the hinge axis (116) is between 65 and 115 degrees;

where the thruster (2) rotates about the hinge axis (116); and a fin (6);
  where the fin (6) does not have an attached control surface;
  where the fin (6) does not rotate with respect to the fixed-wing (1);
  where the fin (6) lies on the plane of symmetry (114), aft of the aircraft's center-of-mass (112), and within the thruster's (2) slipstream (201).

\* \* \* \* \*